United States Patent
Blyth et al.

(10) Patent No.: US 6,761,919 B2
(45) Date of Patent: Jul. 13, 2004

(54) AMBIENT STABLE BEVERAGE

(75) Inventors: Marian Blyth, Bedford (GB); Aminata Yanda Kanu, Bath (GB); Roy Michael Kirby, Bedford (GB); Malcolm Stratford, Bedford (GB)

(73) Assignee: Lipton, division of Conopco, Inc., Englewood Cliffs, NJ (US)

( * ) Notice: Subject to any disclaimer, the term of this patent is extended or adjusted under 35 U.S.C. 154(b) by 60 days.

(21) Appl. No.: 09/854,877

(22) Filed: May 14, 2001

(65) Prior Publication Data

US 2001/0055646 A1 Dec. 27, 2001

(30) Foreign Application Priority Data

May 15, 2000 (GB) .............................................. 0011676

(51) Int. Cl.⁷ .............................. A23F 3/00; A23L 2/44; A23L 2/38
(52) U.S. Cl. .................... 426/330.3; 426/597; 426/331; 426/650; 426/654
(58) Field of Search ............................ 426/330.3, 335, 426/597, 331, 654, 650, 538

(56) References Cited

U.S. PATENT DOCUMENTS

| 5,441,979 A | 8/1995 | Oppong et al. |
| 6,022,576 A | 2/2000 | Cirigliano et al. |
| 6,036,986 A | 3/2000 | Cirigliano et al. |
| 6,042,861 A | 3/2000 | Anslow et al. |

FOREIGN PATENT DOCUMENTS

| FR | 2 728 462 | 11/1994 |
| GB | 1 348 869 | 3/1974 |

OTHER PUBLICATIONS

Patent Act 1977 Search Report under Section 17 (GB 0011676.4).
Abstract of FR 2 728 462 in English.
International Search Report (PCT/EP 01/04856)—date of mailing Oct. 12, 2001.
XP–002174856: RU 2 113 133 C (Food Aromatiser Acid Dye Res. Inst.) Jun. 20, 1998, Derwent Publication—abstract.
Patent Abstracts of Japan, vol. 1999, No. 14, Dec. 22, 1999 & JP 11 243853 A (Itouen Ltd), Sep. 14, 1999.
Patent Abstracts of Japan, vol. 010, No. 345, Nov. 20, 1986 & JP 61 148110 A (Pola Chem Ind Inc), Jul. 5, 1986.
Patent Abstracts of Japan, vol. 018, No. 019, Jan. 13, 1994 & JP 05 255126 A (Zeria Pharmaceut Co Ltd.), Oct. 5, 1993.
Patent Abstracts of Japan, vol. 007, No. 043, Feb. 19, 1983 & JP 57 194775 A (Asama Kasei KK), Nov. 30, 1982.

*Primary Examiner*—Anthony Weier

(57) ABSTRACT

A beverage that contains a preservative system that contains 1 to 175 ppm cinnamic acid, 10 to 200 ppm sorbic acid or benzoic acid, and at least one essential oil other than cinnamic acid. Minimizing the concentration of sorbic and benzoic acid in this way enables one to prepare an ambient-stable beverage whilst avoiding the adverse effects that sorbic and benzoic acid can have on taste.

8 Claims, 27 Drawing Sheets

AMBIENT STABLE BEVERAGE

FIELD OF THE INVENTION

The present invention relates to an ambient stable beverage, particularly a tea based beverage, that is preserved by a minimal amount of sorbic or benzoic acid.

BACKGROUND AND PRIOR ART

In recent years there has been an ever increasing choice for consumers who wish to quench their thirst with ready made beverages. Many of those are now turning from the well known soft drinks to tea based beverages, be those carbonated or still, and the "natural" refreshment they can provide.

Tea contains a complex combination of enzymes, biochemical intermediates and structural elements normally associated with plant growth and photosynthesis. There are also many natural substances that give tea its unique taste, astringency, aroma and colour. Many of these are produced by the oxidation reactions that occur during the so-called fermentation stage of black tea manufacture. Tea production has long been driven by traditional processing methods with only a fundamental understanding of the chemistry that is involved. As a consequence manufacturers have discovered making ambient stable tea based beverages at the volumes required to compete with more traditional soft drinks is not simply a matter of flavouring a soft drink with tea.

The flavour of a tea based beverage and its stability rely on the stability of the beverage as a whole. The fungi including yeasts and moulds that can grow in tea based beverages and other soft drinks can be killed by heat treatment or at least controlled by use of preservatives. Some tea based beverages are therefore pasteurised and then bottled in glass or special heat stable PET containers. This is known as "hot filling". Unfortunately this can be an expensive operation that creates a great deal of environmentally unfriendly waste. It has therefore become more attractive for manufacturers to pack their tea based products in standard PET containers which can range from single serve units to multi-serve packs and maintain the stability of the product using tailor made flavour and preservative systems. This is known as "cold filling". It is also useful in that one can readily use a tea concentrate or powder.

Potassium sorbate is well known preservative. It is a mould and yeast inhibitor and one of the few legally permitted preservatives of soft drinks and fruit juices. It has been listed in the UK Preservatives in Food regulations since at least 1962. The levels of use tend to be in the range of 100–1000 ppm. That has been found to be an effective antimicrobial agent in a variety of foods including carbonated beverages in certain fruit and vegetable products, including wines. It is sorbic acid that is the effective agent.

Unfortunately even moderate levels of sorbic or benzoic acid can seriously affect the flavour of a tea based beverage. Adding a strong flavour such as lemon can offset the preservative taste. However consumers are keen to experience other flavours, often more delicate flavours. Furthermore, some of those consumers that were drawn to tea based products as a more healthy and natural alternative to soft drinks would reduce their intake of preservatives generally.

The applicants addressed a similar problem with resect to tea based beverages in U.S. Pat. No. 6,036,986. However the solution proposed there was to gradually adjust water hardness and pH and gradually add polyphosphate, benzoic acid, sorbic acid and cinnamic acid.

However there is still a need for pleasantly flavoured, ambient-stable, tea based beverages that contain minimal amounts of preservatives such as sorbic and benzoic acids. Non-tea based beverages including fruit and soft drinks can be stabilised in a similar way.

In response to that need the present inventors have now developed an ambient stable beverage that is preserved by a minimal amount of sorbic or benzoic acid.

STATEMENT OF THE INVENTION

The invention can in broad terms be said to relate to an ambient stable beverage, particularly a tea based beverage, that contains a preservative system comprising 1 to 175 ppm cinnamic acid, 10 to 200 ppm sorbic acid or benzoic acid, and at least one essential oil other than cinnamic acid. When the beverage is tea based it preferably contains 0.01 to 3% tea solids, especially about 0.14% tea solids.

The beverage preferably contains 1 to 100 ppm of the essential oil.

The invention can also be said to relate to a method for preparing an ambient-stable tea based beverage suitable for cold filing comprising preserving a tea extract with a preservative system comprising 1 to 175 ppm cinnamic acid, 10 to 200 ppm sorbic acid or benzoic acid, and at least one essential oil other than cinnamic acid.

"Beverage" for the purposes of the present invention means any drink, other than water, and includes soft drinks, fruit drinks, coffee based drinks and tea based drinks.

"Essential oil" for the purposes of the present invention includes any of the volatile oils in plants having the odour or flavour of the plant from which they are extracted. It also includes one or more of the components of that oil that is or are responsible for or at least contributes to the odour or flavour of that plant.

"Tea" for the purposes of the present invention means leaf material from *Camellia sinensis* var. *sinensis* or *Camellia sinensis* var. *assamica*. "Tea" is also intended to include the product of blending two or more of any of these teas.

For the avoidance of doubt the word "comprising" is intended to mean including but not necessarily "consisting of" or "composed of". In other words the listed steps or options need not be exhaustive.

Except in the operating and comparative examples, or where otherwise explicitly indicated, all numbers in this description indicating amounts or concentrations of material ought to be understood as modified by the word "about".

DETAILED DESCRIPTION OF THE INVENTION

Figure 1:
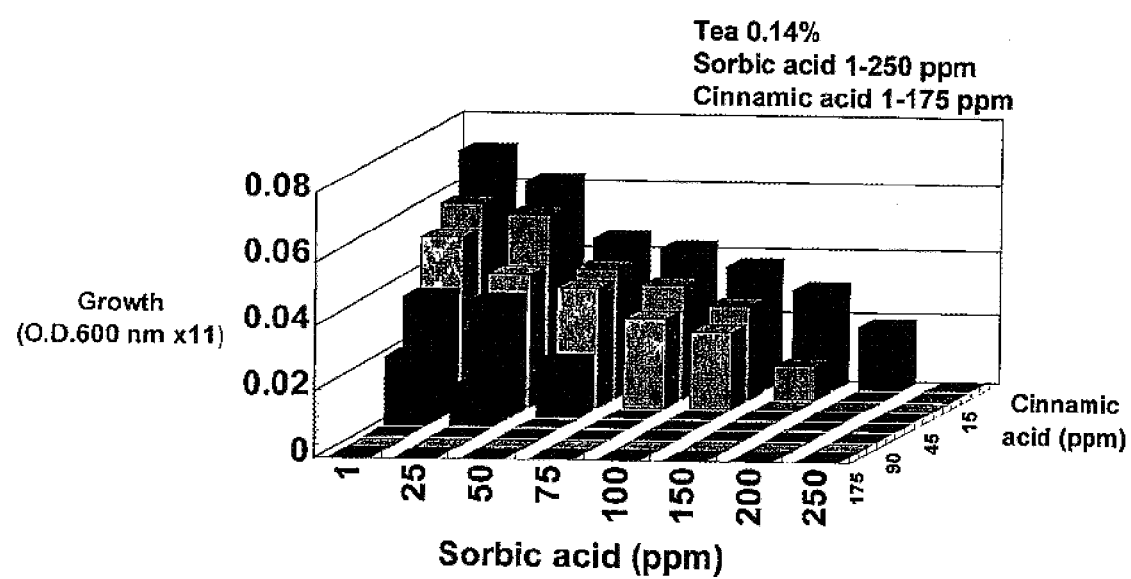
FIG. 1 shows the results of a control experiment of growth of yeast *Saccharomyces cerevisiae* X2180-1B in a matrix of tubes of Ready to Drink tea, 0.14% tea, containing various levels of preservatives, sorbic acid and cinnamic acid.

The ambient stable beverage of the present invention contains a preservative system a cinnamic acid, a minimal amount of sorbic or benzoic acid and an essential oil other than cinnamic acid. The beverage is preferably a tea based beverage but non-tea based beverages including fruit and soft drinks can be stabilised using the same preservative system.

When the beverage is a tea based beverage it will contain a tea extract. The tea extract can be obtained by any suitable means. Preferably tea leaves are extracted in hot water over a period of between 20 minutes and 5 hours. The extract can be dried to form a powder, reconstituted to form an acidic beverage, or concentrated to form a syrup from which one can prepare a tea based beverage.

Tea is known to have certain antibacterial and antiviral properties in itself. One must exceed a concentration of about 3% to evidence tea beginning to suppress the growth of yeasts and moulds. At concentrations lower than this, which is typical for tea based beverages, tea acts as a nutrient that enhances the potential for microbial spoilage. The beverage should therefore contain 0.01 to 3% tea solids, about 0.14% being particularly preferred.

The preservative system comprises 1 to 175 ppm cinnamic acid, 10 to 200 ppm sorbic or benzoic acid and an essential oil other than cinnamic acid.

The inventors tested the following compounds: acetaldehyde, 2-acetylfuran, amyl acetate, amyl alcohol, α-amylcinnamaldehyde, amyl formate, trans-anethole, m-anisaldehyde, o-anisaldehyde, p-anisaldehyde, anisole, anisyl alcohol, benzaldehyde, benzaldehyde dimethyl acetal, benzoin, benzophenone, benzothiazole, benzyl acetate, benzyl acetoacetate, benzyl alcohol, benzyl benzoate, benzyl cinnamate, benzyl ether (dibenzyl ether), benzyl formate, benzyl-4-hydroxybenzoate, biphenyl, borneol, butanal, 1-butanol, 2-butanone, butyl acetate, tert-butyl acetoacetate, butyl butyrate, 4-tert-butylcyclohexanone, tert-butyl ethyl malonate, butyl formate, butyl lactate, butyl levulinate, butyl phenyl ether, butyl propionate, butyric acid, γ-butyrolactone, caffeic acid, caffeine, (+)-camphene, (−)-camphene, campher, carvacrol, carveol, carvone, carvyl acetate, carvyl propionate, caryophyllene oxide, cedarwood oil, cineole, cinnamaldehyde, cinnamyl acetate, cinnamyl alcohol, cinnamyl chloride, cinnamyl formate, cinnamon oil, trans-cinnamoyl chloride, citral, citral dimethyl acetal, (S)-citronellic acid, (R)+citronellic acid, citronellal, citronellol, coumaric acid, creosol, m-cresol, o-cresol, p-cresol, cumene, cumic acid, cumic alcohol, cuminaldehyde, cumic aniline, cyclohexanebutyric acid, cyclohexyl acetate, cyclohexylacetic acid, 2-cyclohexylethyl acetate, p-cymene, trans,trans-2,4-decadienal, decanal, decanol, δ-decanolactone, 3-decanone, decanoic acid, trans-4-decenal, diacetyl (2,3-butanedione), diethyl malonate, 2,3-diethyl pyrazine, diethyl succinate, diethyl L-tartrate, dihydrocarveol, dihydrocarvone, dihydrocoumarin, 2,6-dimethyl-4-heptanol, 2,6-dimethyl-5-heptenal (melonal), 3,7-dimethyl-1-octanol2,3-Dimethyl pyrazine, dimethyl succinate (DBE-4), dodecane, estragole (4-allylanisole), ethyl acetate, ethyl butyrate, ethyl cyclohexanepropionate, ethyl decanoate (caprate), ethyl formate, ethyl heptanoate, ethyl hexanoate, 2-ethyl-1-hexanol, ethyl myristate, ethyl nonanoate, ethyl octanoate (caprylate), ethyl palmitate, ethyl propionoate, ethyl pyruvate, ethyl sorbate, ethyl tridecanoate, ethyl undecanoate, ethyl valerate, ethyl vanillin, eugenol, ferulic acid, fumaric acid, geranic acid, geraniol, geranyl acetate, glyceryl tribenzoate (tribenzoin), glycyrrhizic acid, guaiacol, heptanal, heptanoic acid, 1-heptanol, hexanal, hexanoic acid (caproic), 1-hexanol, 2-hexanol, 3-hexanol, 3-hexanone, trans-2-hexenoic acid, trans-3-hexenoic acid, cis-2-hexen-1-ol, trans-2-hexen-1-ol, hexyl acetate, 4-hexylbenzoic acid, trans-β-hydromuconic acid, m-hydroxybenzoic acid, p-hydroxybenzoic acid, o-hydroxybiphenyl, hydroxycitronellal, γ-ionone, isoamyl acetate, isobutyl acetate, isobutyric acid, isoeugenol, isopropyl acetate, jasmone, leucine, limonene, linalool, linalyl acetate, menthol, menthone, 4-methoxybenzyl alcohol, o-methoxycinnamaldehyde, 4-(p-methoxyphenyl)-2-butanone, methyl acetate, methyl anthranilate, methyl butyrate, α-methyl-trans-cinnamaldehyde, methyl decanoate, methyl eugenol, methyl heptanoate (enanthate), methyl hexanoate (caproate), methyl laurate, methyl myristate, methyl nonanoate, methyl octanoate (caprylate), 2-methyl-2-pentenal, 5-methyl-2-phenyl-2-hexenal, methyl propionate, methyl salicylate, 4-methyl-5-thiazole ethanol, 4-methyl-5-thiazoleethanol acetate, methyl tridecanoate, methyl valerate, methyl undecanoate, β-myrcene, 7-methyl-3-methylene-1,6-octadiene, myristaldehyde, myrtenol, neomenthol, nerol, nerolidol, nonanal, nonanoic acid, γ-nonanoic lactone, 1-nonanol, δ-octalactone, octanal, octanoic acid (caprylic), 1-octanol, octyl acetate, pentanal, pentanol, phenylacetic acid, phenylacetone, 1-phenyl-1,2-propanedione, 2-phenylpropionic acid, 3-phenylpropionic acid (hydrocinnamic acid), pinene, piperonyl acetate, propanal, 1-propanol, 2-propanol (isopropanol), propenylguaethol, propyl acetate, propyl benzoate, pulegone, quinine hydrochloride, safrole, salicylaldehyde, skatole (3-methylindole), sorbic alcohol (2,4-hexandienol), sorbic aldehyde (2,4-hexadienal), tartaric acid, α-terpinene, γ-terpinene, terpinen-4-ol, terpineol, tolualdehyde, thymol, triacetin (glyceryl triacetate), tributyl acetylcitrate, tributyrin, 3,5,5-trimethyl-1-hexanol, γ-undecalactone, undecanal, undecane, undecanoic acid, 1-undecanol, 2-undecanol, valeric acid, vanillic acid, vanillin, vanillyl alcohol and veratraldehyde.

Table 1 below contains those of essential oils listed above that exhibited a fungicidal activity suitable for use in the present invention. The minimum inhibitory concentration (MIC) is given for each compound.

TABLE I

Preferred essential oils

| COMPOUND | MIC (ppm) |
|---|---|
| Benzyl-4-hydroxybenzoate | 68 |
| 4-tert-Butylcyclohexanone | 462 |
| Carvone | 300 |
| Cinnamaldehyde | 66 |
| Citral | 228 |
| Citral dimethyl acetal | 198 |
| Citronellol | 125 |
| Cumic alcohol | 450 |
| Cyclohexanebutyric acid | 68 |
| 2-Cyclohexylethyl acetate | 102 |
| trans,trans-2,4-Decadienal | 8 |
| Decanal | 47 |
| Decanol | 24 |
| Dihydrocarveol | 540 |
| 3,7-Dimethyl-1-octanol | 15.8 |
| Ethyl cyclohexanepropionate | 184 |
| Ethyl pyruvate | 1392 |
| Ethyl vanillin | 249 |
| Jasmone | 246 |
| o-Methoxycinnamaldehyde | 130 |
| Methyl anthranilate | 310 |
| α-Methyl-trans-cinnamaldehyde | 58.4 |
| Methyl eugenol | 356 |
| Methyl nonanoate | 90 |
| 2-Methyl-2-pentenal | 1274 |
| 5-Methyl-2-phenyl-2-hexenal | 162 |
| Methyl salicylate | 152 |
| 4-Methyl-5-thiazoleethanol acetate | 1110 |
| Myrtenol | 137 |
| Neomenthol | 156 |
| Nonanoic acid | 63 |
| γ-Nonanoic lactone | 63 |
| δ-Octalactone | 568 |
| Octanoic acid (caprylic) | 115 |
| 1-Octanol | 247 |
| 1-Phenyl-1,2-propanedione | 222 |
| Piperonyl acetate | 242 |
| Propyl benzoate | 66 |
| Pulegone | 152 |
| Sorbic aldehyde (2,4-hexadienal) | 86 |
| Terpinen-4-ol | 616 |
| Tolualdehyde | 240 |
| γ-Undecalactone | 28 |
| Undecanal | 34 |
| 1-Undecanol | 14 |
| Vanillin | 1216 |

The preservative system preferably contains 1 to 100 ppm of the essential oil.

Some of the aforementioned essential oils were found to be particularly preferred in respect of their impact on the taste profile of tea based beverages containing them. These are listed in Table II below. In each case the respective minimum inhibitory concentration (MIC) and preferred concentration is also given.

TABLE II

Particularly preferred essential oils

| COMPOUND | MIC (ppm) | Conc (ppm) |
|---|---|---|
| Citral | 228 | 1–30 |
| Citral dimethyl acetal | 198 | 1–30 |
| Cumic alcohol | 450 | 1–40 |
| trans, trans-2,4-Decadienal | 8 | 1–20 |

TABLE II-continued

Particularly preferred essential oils

| COMPOUND | MIC (ppm) | Conc (ppm) |
|---|---|---|
| 3,7-Dimethyl-1-octanol | 15.8 | 1–20 |
| Ethyl pyruvate | 1392 | 1–40 |
| Myrtenol | 137 | 1–20 |
| Piperonyl acetate | 242 | 1–20 |

An especially preferred preservative system for tea based beverages, based on preservative action and taste profile comprises 1 to 30 ppm cinnamic acid, 1 to 30 ppm citral dimethyl acetal, 1 to 40 ppm cumic alcohol (isopropylbenzyl alcohol), and 1 to 20 myrtenol and piperonyl acetate.

Water quality can seriously undermine the stability of a beverage. This is a particularly important factor when making a tea based beverage for cold filing. For that purpose it will often be important to minimise the yeast content of water used at all stages of production. Art known methods include chlorination/dechlorination and UV irradiation.

Ambient-stable beverages of the invention may be still or carbonated. Carbonation appears to provide a preservative effect in itself and therefore the formulation of a carbonated product need not be the same as a still one.

Tea based beverages commonly contain sugar or some other sweetener to counter the sometimes astringent taste of tea. Most microbes that can typically grow in tea based beverages thrive on sugar, a source of nitrogen, oxygen, zinc, magnesium, potassium, phosphate and vitamins. It is therefore advantageous to limit the sugar content to 8 to 10 degrees brix, however one could use up to 60 degrees brix when the product is a tea mix.

Oxygen content can be minimised by pre-pasteurisation or some heat treatment or nitrogen sparging. The mineral content of a tea based beverage can be minimised using EDTA, citrate, or a water softener. For example microbes can grow in tea if the concentration of magnesium ions exceeds 0.2 ppm, and they only need trace levels of zinc.

The present invention also relates to a method for preparing a method for preparing an ambient-stable tea based beverage that is suitable for cold filing. The method comprises preserving a tea extract with a preservative system comprising preserving a tea extract with a preservative system comprising 1 to 175 ppm cinnamic acid, 10 to 200 ppm sorbic acid or benzoic acid, and at least one essential oil other than cinnamic acid.

The ambient stable beverage of the present invention with now be described in the following examples with reference to the accompanying drawings.

EXAMPLE 1
Sorbic Acid in RTD Tea Experiments

FIG. 1 shows the results of a control experiment of growth of yeast *Saccharomyces cerevisiae* X2180-1B in a matrix of tubes of Ready to Drink tea, 0.14% tea, containing various levels of preservatives, sorbic acid and cinnamic acid. The matrix of 30 ml tubes each contained 10 ml RTD tea, pH 3.4. Sorbic acid was used in the range 1–250 ppm and cinnamic acid in the range 1–175 ppm. Tubes were inoculated with $10^4$ cells of the yeast *Saccharomyces cerevisiae* X2180-1B. Tubes were then incubated for 14 days at 25° C. to allow surviving yeasts to grow out. At 14 days growth was measured by optical density at 600 nm in x11 diluted samples, and blank values subtracted.

Figure 2:
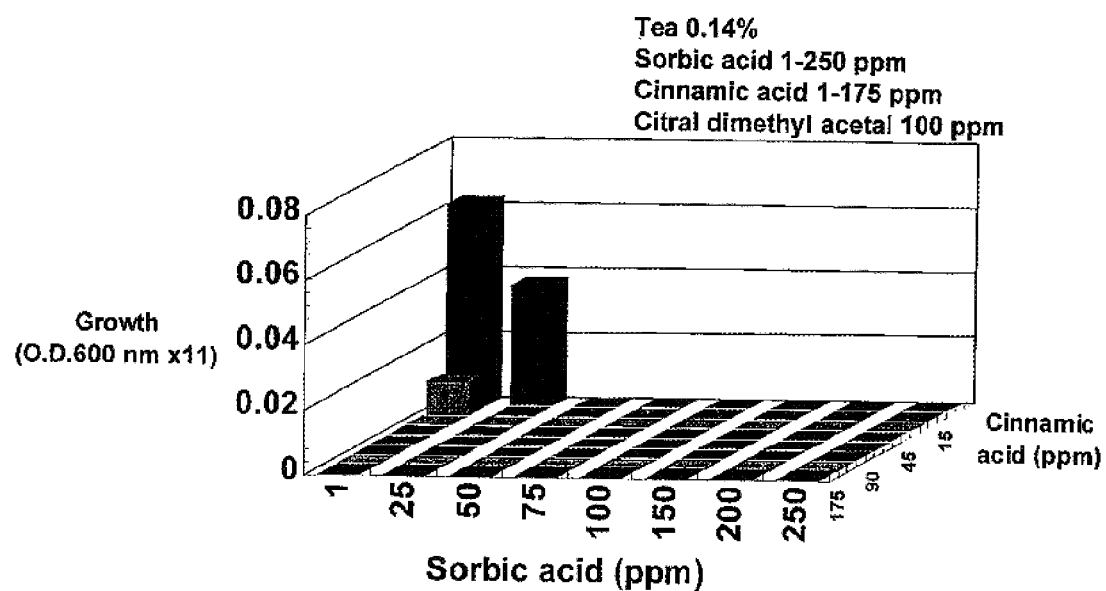
FIG. 2 shows the combined effect of citral dimethyl acetal, cinnamic acid and sorbic acid on growth of yeast *Saccharomyces cerevisiae* X2180-1B in a matrix of tubes of Ready to Drink tea, 0.14% tea.

FIG. 2 shows the combined effect of citral dimethyl acetal, cinnamic acid and sorbic acid on growth of yeast *Saccharomyces cerevisiae* X2180-1B in a matrix of tubes of Ready to Drink tea, 0.14% tea. The matrix of 30 ml tubes each containing 10 ml RTD tea pH 3.4, all contained 100 ppm citral dimethyl acetal. Sorbic acid was used in the range 1–250 ppm and cinnamic acid in the range 1-175 ppm. Tubes were inoculated with $10^4$ cells of the yeast *Saccharomyces cerevisiae* X2180-1B. Tubes were incubated for 14 days at 25° C. to allow surviving yeasts to grow out. At 14 days growth was measured by optical density at 600 nm in x11 diluted samples, and blank values subtracted.

Comparison of this Figure with FIG. 1 shows very substantially fewer tubes supporting yeast growth in the presence of the essential oil component, citral dimethyl acetal, showing a powerful combination effect of essential oil components and preservatives.

Figure 3:
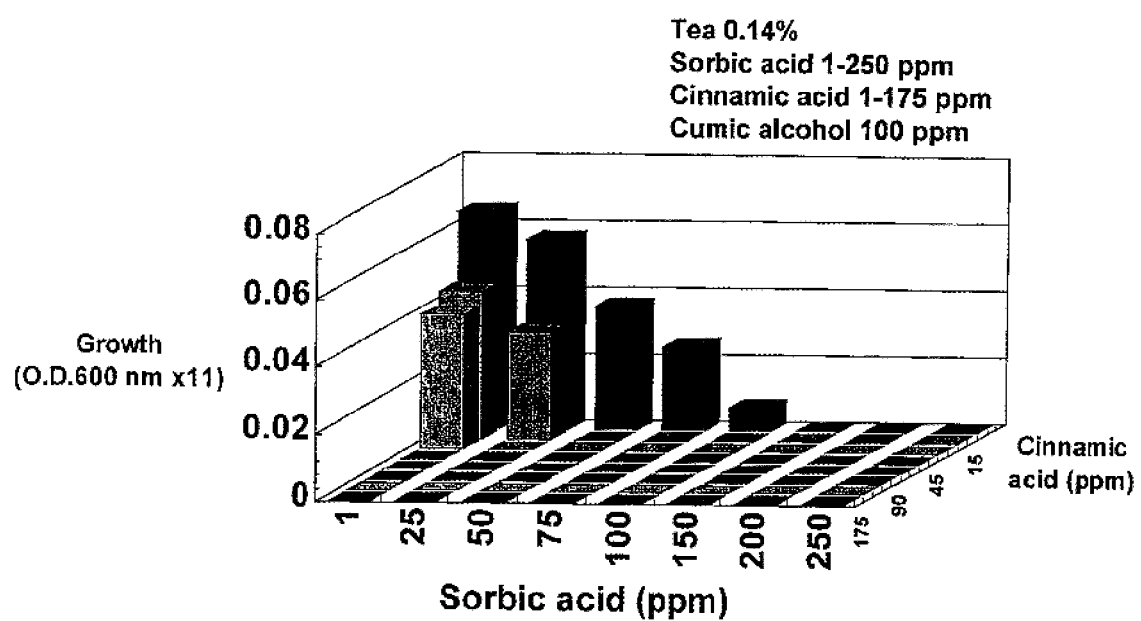
FIG. 3 shows the combined effect of cumic alcohol, cinnamic acid and sorbic acid on growth of yeast *Saccharomyces cerevisiae* X2180-1B in a matrix of tubes of Ready to Drink tea, 0.14% tea.

FIG. 3 shows the combined effect of cumic alcohol, cinnamic acid and sorbic acid on growth of yeast *Saccharomyces cerevisiae* X2180-1B in a matrix of tubes of Ready to Drink tea, 0.14% tea. The matrix of 30 ml tubes each containing 10 ml RTD tea pH 3.4, all contained 100 ppm cumic alcohol. Sorbic acid was used in the range 1–250 ppm and cinnamic acid in the range 1–175 ppm. Tubes were inoculated with $10^4$ cells of the yeast *Saccharomyces cerevisiae* X2180-1B. Tubes were incubated for 14 days at 25° C. to allow surviving yeasts to grow out. At 14 days growth was measured by optical density at 600 nm in x11 diluted samples, and blank values subtracted.

Comparison of this Figure with FIG. 1 shows very substantially fewer tubes supporting yeast growth in the presence of the essential oil component, cumic alcohol, showing a powerful combination effect of essential oil components and preservatives.

Figure 4:
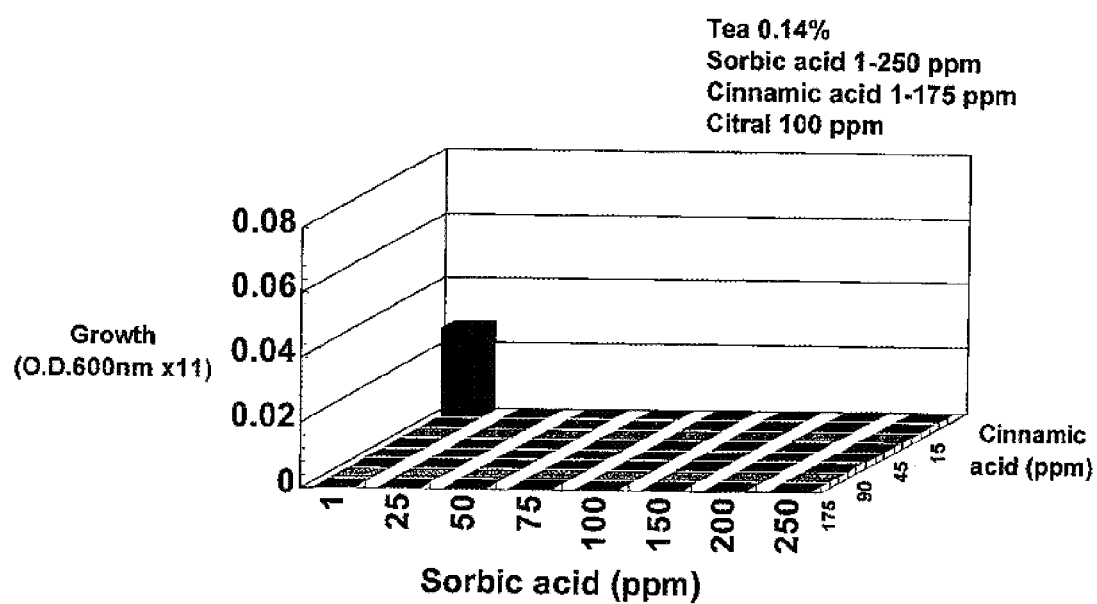
FIG. 4 shows the combined effect of citral, cinnamic acid and sorbic acid on growth of yeast *Saccharomyces cerevisiae* X2180-1B in a matrix of tubes of Ready to Drink tea, 0.14% tea.

FIG. 4 shows the combined effect of citral, cinnamic acid and sorbic acid on growth of yeast *Saccharomyces cerevisiae* X2180-1B in a matrix of tubes of Ready to Drink tea, 0.14% tea. The matrix of 30 ml tubes each containing 10 ml RTD tea pH 3.4, all contained 100 ppm citral. Sorbic acid was used in the range 1–250 ppm and cinnamic acid in the range 1–175 ppm. Tubes were inoculated with $10^4$ cells of the yeast *Saccharomyces cerevisiae* X2180-1B. Tubes were incubated for 14 days at 25° C. to allow surviving yeasts to grow out. At 14 days growth was measured by optical density at 600 nm in x11 diluted samples, and blank values subtracted.

Comparison of this Figure with FIG. 1 shows very substantially fewer tubes supporting yeast growth in the presence of the essential oil component, citral, showing a powerful combination effect of essential oil components and preservatives.

Figure 5:
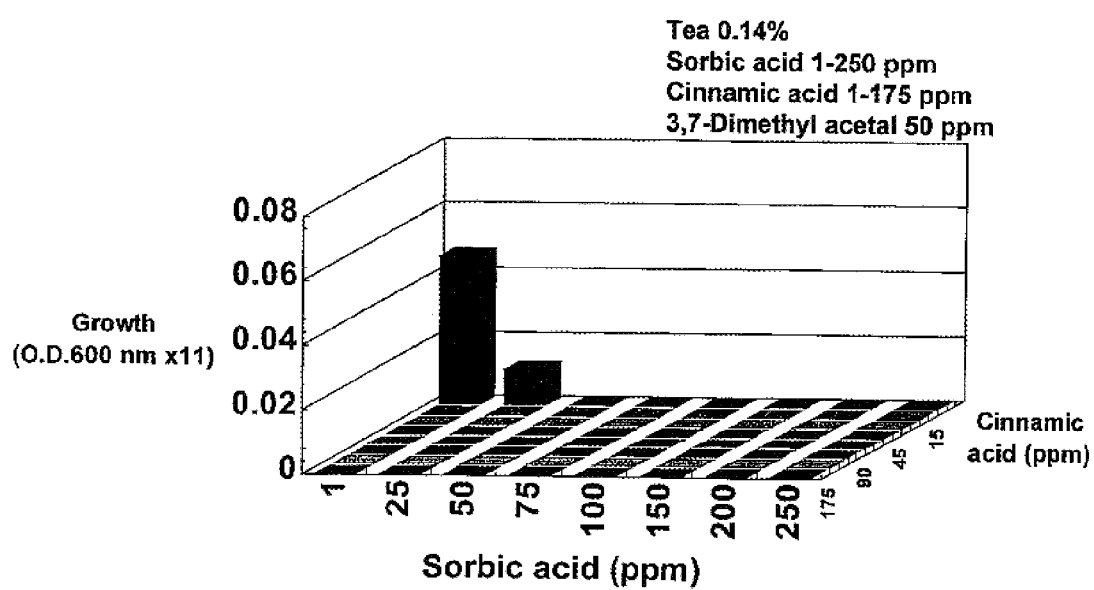
FIG. 5 shows the combined effect of 3,7-dimethyl octanol, cinnamic acid and sorbic acid on growth of yeast *Saccharomyces cerevisiae* X2180-1B in a matrix of tubes of Ready to Drink tea, 0.14% tea.

FIG. 5 shows the combined effect of 3,7-dimethyl octanol, cinnamic acid and sorbic acid on growth of yeast *Saccharomyces cerevisiae* X2180-1B in a matrix of tubes of Ready to Drink tea, 0.14% tea. The matrix of 30 ml tubes each containing 10 ml RTD tea pH 3.4, all contained 50 ppm 3,7-dimethyl octanol. Sorbic acid was used in the range 1–250 ppm and cinnamic acid in the range 1–175 ppm. Tubes were inoculated with $10^4$ cells of the yeast *Saccharomyces cerevisiae* X2180-1B. Tubes were incubated for 14 days at 25° C. to allow surviving yeasts to grow out. At 14 days growth was measured by optical density at 600 nm in x11 diluted samples, and blank values subtracted.

Comparison of this Figure with FIG. 1 shows very substantially fewer tubes supporting yeast growth in the presence of the essential oil component, 3,7-dimethyl octanol, showing a powerful combination effect of essential oil components and preservatives.

Figure 6:
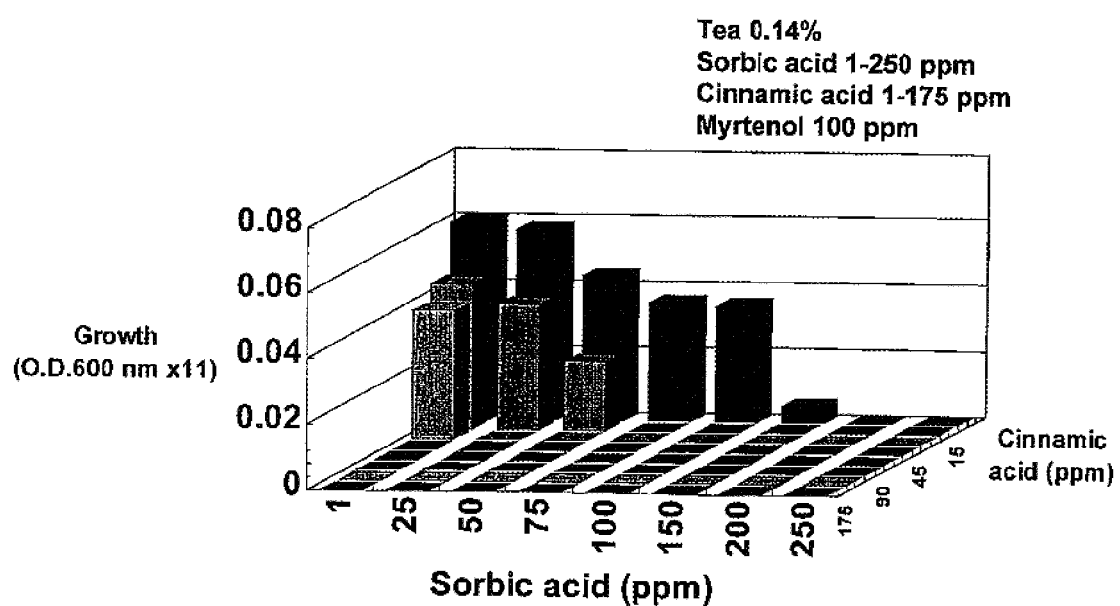
FIG. 6 shows the combined effect of myrtenol, cinnamic acid and sorbic acid on growth of yeast *Saccharomyces cerevisiae* X2180-1B in a matrix of tubes of Ready to Drink tea, 0.14% tea.

FIG. 6 shows the combined effect of myrtenol, cinnamic acid and sorbic acid on growth of yeast *Saccharomyces* cerevisiae X2180-1B in a matrix of tubes of Ready to Drink tea, 0.14% tea. The matrix of 30 ml tubes each containing 10 ml RTD tea pH 3.4, all contained 100 ppm myrtenol. Sorbic acid was used in the range 1–250 ppm and cinnamic acid in the range 1–175 ppm. Tubes were inoculated with $10^4$ cells of the yeast *Saccharomyces cerevisiae* X2180-1B. Tubes were incubated for 14 days at 25° C. to allow surviving yeasts to grow out. At 14 days growth was measured by optical density at 600 nm in x11 diluted samples, and blank values subtracted.

Comparison of this Figure with FIG. 1 shows very substantially fewer tubes supporting yeast growth in the presence of the essential oil component, myrtenol, showing a powerful combination effect of essential oil components and preservatives.

Figure 7:
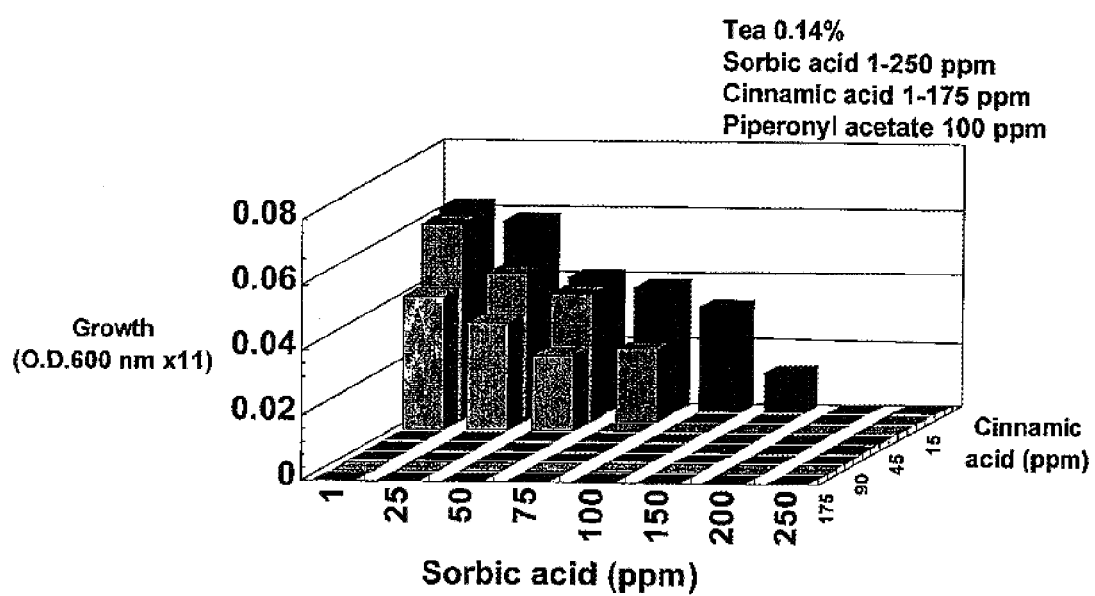
FIG. 7 shows the combined effect of piperonyl acetate, cinnamic acid and sorbic acid on growth of yeast *Saccharomyces cerevisiae* X2180-1B in a matrix of tubes of Ready to Drink tea, 0.14% tea

FIG. 7 shows the combined effect of piperonyl acetate, cinnamic acid and sorbic acid on growth of yeast *Saccharomyces cerevisiae* X2180-1B in a matrix of tubes of Ready to Drink tea, 0.14% tea. The matrix of 30 ml tubes each containing 10 ml RTD tea pH 3.4, all contained 100 ppm piperonyl acetate. Sorbic acid was used in the range 1–250 ppm and cinnamic acid in the range 1–175 ppm. Tubes were inoculated with $10^4$ cells of the yeast *Saccharomyces cerevisiae* X2180-1B. Tubes were incubated for 14 days at 25° C. to allow surviving yeasts to grow out. At 14 days growth was measured by optical density at 600 nm in x11 diluted samples, and blank values subtracted.

Comparison of this Figure with FIG. 1 shows very substantially fewer tubes supporting yeast growth in the presence of the essential oil component, piperonyl acetate, showing a powerful combination effect of essential oil components and preservatives.

Figure 8:
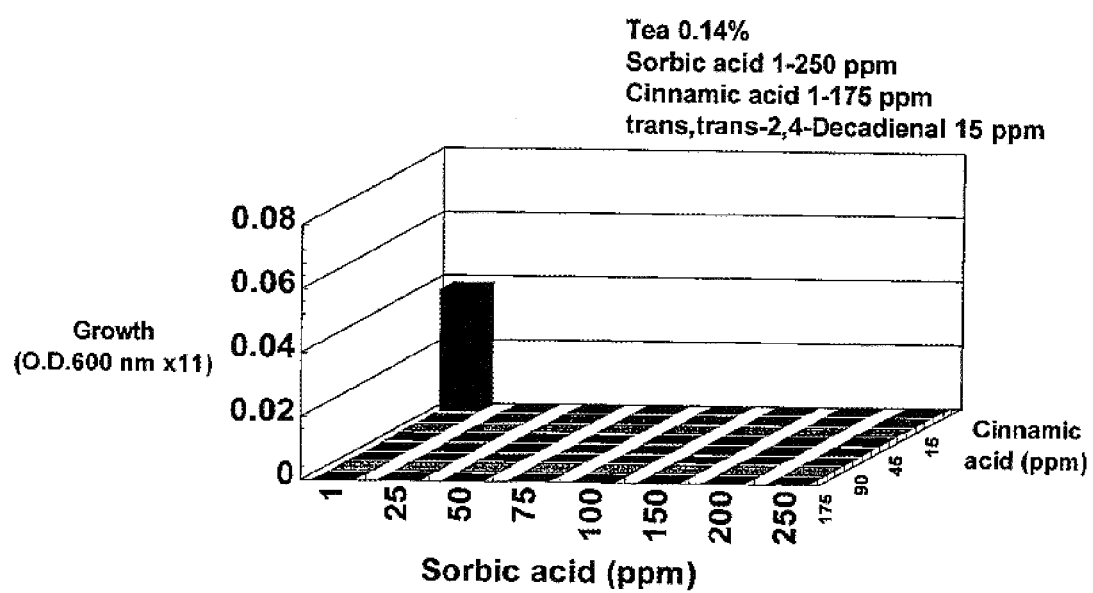
FIG. 8 shows the combined effect of trans,trans-2,4-decadienal, cinnamic acid and sorbic acid on growth of yeast *Saccharomyces cerevisiae* X2180-1B in a matrix of tubes of Ready to Drink tea, 0.14% tea.

FIG. 8 shows the combined effect of trans,trans-2,4-decadienal, cinnamic acid and sorbic acid on growth of yeast *Saccharomyces cerevisiae* X2180-1B in a matrix of tubes of Ready to Drink tea, 0.14% tea. The matrix of 30 ml tubes each containing 10 ml RTD tea pH 3.4, all contained 15 ppm trans, trans-2,4-decadienal. Sorbic acid was used in the range 1–250 ppm and cinnamic acid in the range 1–175 ppm. Tubes were inoculated with $10^4$ cells of the yeast *Saccharomyces cerevisiae* X2180-1B. Tubes were incubated for 14 days at 25° C. to allow surviving yeasts to grow out. At 14 days growth was measured by optical density at 600 nm in x11 diluted samples, and blank values subtracted.

Comparison of this Figure with FIG. 1 shows very substantially fewer tubes supporting yeast growth in the presence of the essential oil component, trans, trans-2,4-decadienal, showing a powerful combination effect of essential oil components and preservatives.

Figure 9:
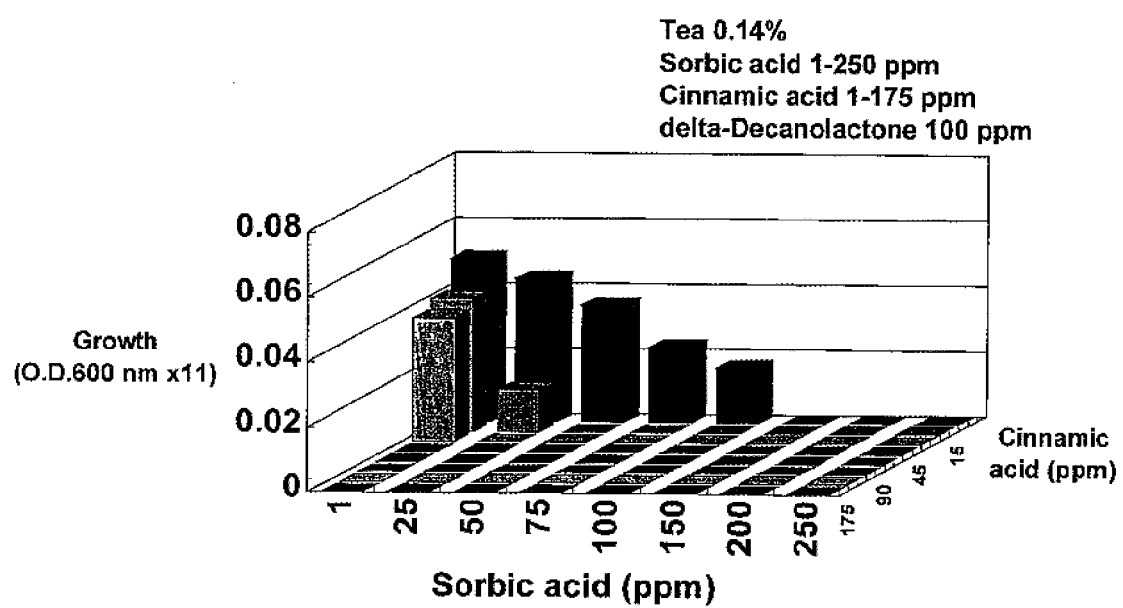
FIG. 9 shows the combined effect of δ-decanolactone (δ-decalactone), cinnamic acid and sorbic acid on growth of yeast *Saccharomyces cerevisiae* X2180-1B in a matrix of tubes of Ready to Drink tea, 0.14% tea.

FIG. 9 shows the combined effect of δ-decanolactone (δ-decalactone), cinnamic acid and sorbic acid on growth of yeast *Saccharomyces cerevisiae* X2180-1B in a matrix of tubes of Ready to Drink tea, 0.14% tea. The matrix of 30 ml tubes each containing 10 ml RTD tea pH 3.4, all contained 100 ppm δ-decanolactone. Sorbic acid was used in the range 1–250 ppm and cinnamic acid in the range 1–175 ppm. Tubes were inoculated with $10^4$ cells of the yeast *Saccharomyces cerevisiae* X2180-1B. Tubes were incubated for 14 days at 25° C. to allow surviving yeasts to grow out. At 14 days growth was measured by optical density at 600 nm in x11 diluted samples, and blank values subtracted.

Comparison of this Figure with FIG. 1 shows very substantially fewer tubes supporting yeast growth in the presence of the essential oil component, δ-decanolactone, showing a powerful combination effect of essential oil components and preservatives.

Figure 10:
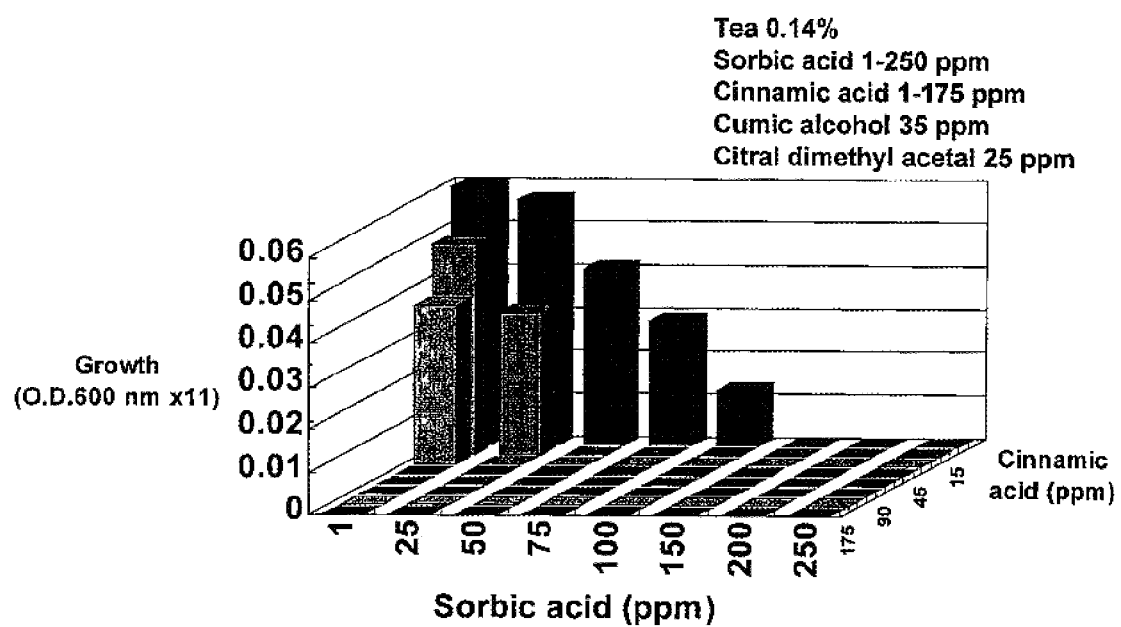
FIG. 10 shows the combined effect of citral dimethyl acetal, cumic alcohol, cinnamic acid and sorbic acid on growth of yeast *Saccharomyces cerevisiae* X2180-1B in a matrix of tubes of Ready to Drink tea, 0.14% tea.

FIG. 10 shows the combined effect of citral dimethyl acetal, cumic alcohol, cinnamic acid and sorbic acid on growth of yeast *Saccharomyces cerevisiae* X2180-1B in a matrix of tubes of Ready to Drink tea, 0.14% tea. The matrix of 30 ml tubes each containing 10 ml RTD tea pH 3.4, all contained 25 ppm citral dimethyl acetal and 35 ppm cumic alcohol. Sorbic acid was used in the range 1–250 ppm and cinnamic acid in the range 1–175 ppm. Tubes were inoculated with $10^4$ cells of the yeast *Saccharomyces cerevisiae* X2180-1B. Tubes were incubated for 14 days at 25° C. to allow surviving yeasts to grow out. At 14 days growth was measured by optical density at 600 nm in x11 diluted samples, and blank values subtracted.

Comparison of this Figure with FIG. 1 shows very substantially fewer tubes supporting yeast growth in the presence of the essential oil components, citral dimethyl acetal and cumic alcohol, showing a powerful combination effect of essential oil components and preservatives.

EXAMPLE 2

Sorbic Acid in Synthetic Soft Drink Experiments

Figure 11:
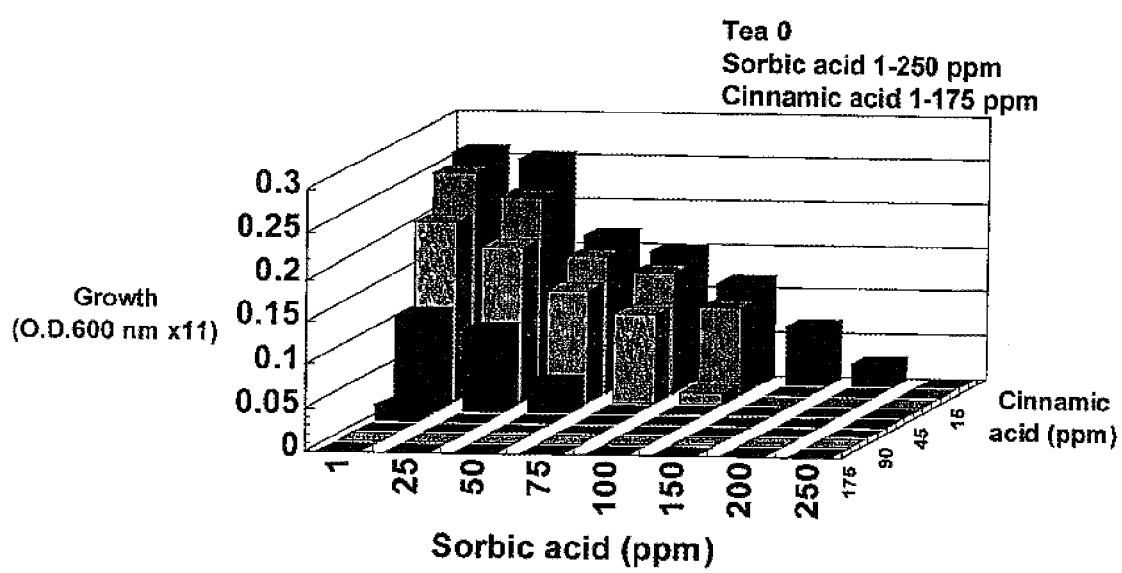
FIG. 11 shows the results of a control experiment of growth of yeast *Saccharomyces cerevisiae* X2180-1B in a matrix of tubes of synthetic soft drink, 0% tea, containing various levels of preservatives, sorbic acid and cinnamic acid.

FIG. 11 shows the results of a control experiment of growth of yeast *Saccharomyces cerevisiae* X2180-1B in a matrix of tubes of synthetic soft drink, 0% tea, containing various levels of preservatives, sorbic acid and cinnamic acid. Synthetic soft drink contained glucose, 8%w/v, citric acid 3 g/l, potassium orthophosphate 1 g/l, magnesium chloride 0.1 g/l and yeast extract 0.1 g/l. The matrix of 30 ml tubes each contained 10 ml synthetic soft drink, pH 3.4. Sorbic acid was used in the range 1–250 ppm and cinnamic acid in the range 1–175 ppm. Tubes were inoculated with $10^4$ cells of the yeast *Saccharomyces cerevisiae* X2180-1B. Tubes were then incubated for 14 days at 25° C. to allow surviving yeasts to grow out. At 14 days growth was measured by optical density at 600 nm in x11 diluted samples, and blank values subtracted.

Figure 12:
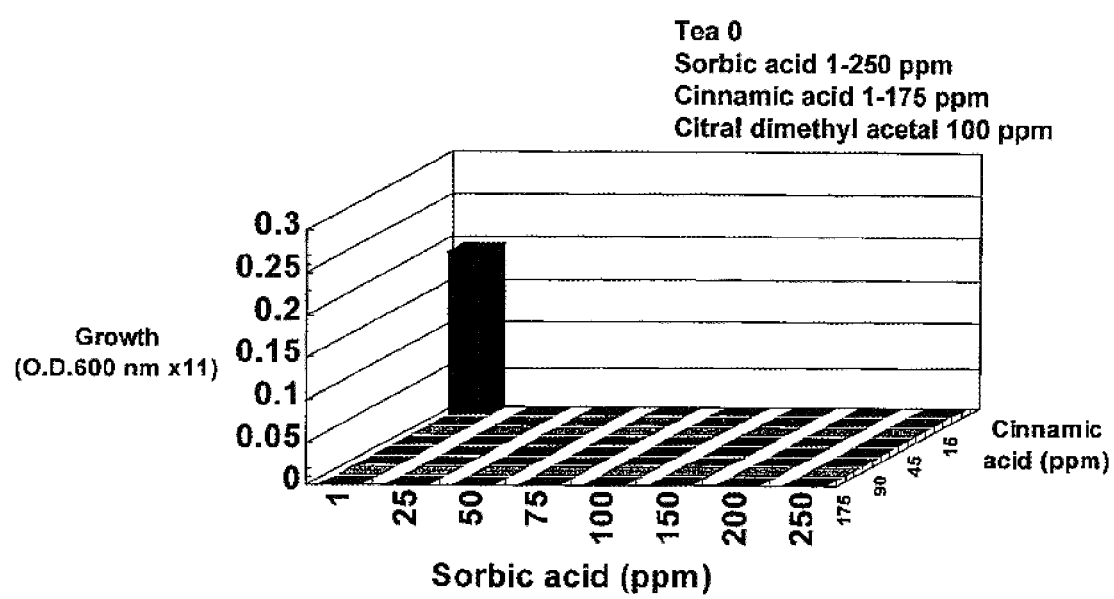
FIG. 12 shows the combined effect of citral dimethyl acetal, cinnamic acid and sorbic acid on growth of yeast *Saccharomyces cerevisiae* X2180-1B in a matrix of tubes of synthetic soft drink, 0% tea. Synthetic soft drink contained glucose, 8%w/v, citric acid 3 g/l, potassium orthophosphate 1 g/l, magnesium chloride 0.1 g/l and yeast extract 0.1 g/l.

FIG. 12 shows the combined effect of citral dimethyl acetal, cinnamic acid and sorbic acid on growth of yeast *Saccharomyces cerevisiae* X2180-1B in a matrix of tubes of synthetic soft drink, 0% tea. Synthetic soft drink contained glucose, 8%w/v, citric acid 3 g/l, potassium orthophosphate 1 g/l, magnesium chloride 0.1 g/l and yeast extract 0.1 g/l. The matrix of 30 ml tubes each containing 10 ml synthetic soft drink pH 3.4, all contained 100 ppm citral dimethyl acetal. Sorbic acid was used in the range 1–250 ppm and cinnamic acid in the range 1–175 ppm. Tubes were inoculated with $10^4$ cells of the yeast *Saccharomyces cerevisiae* X2180-1B. Tubes were incubated for 14 days at 25° C. to allow surviving yeasts to grow out. At 14 days growth was measured by optical density at 600 nm in x11 diluted samples, and blank values subtracted.

Comparison of this Figure with FIG. 11 shows very substantially fewer tubes supporting yeast growth in the presence of the essential oil component, citral dimethyl acetal, showing a powerful combination effect of essential oil components and preservatives.

EXAMPLE 3

Benzoic Acid in RTD Tea Experiments

Figure 13:
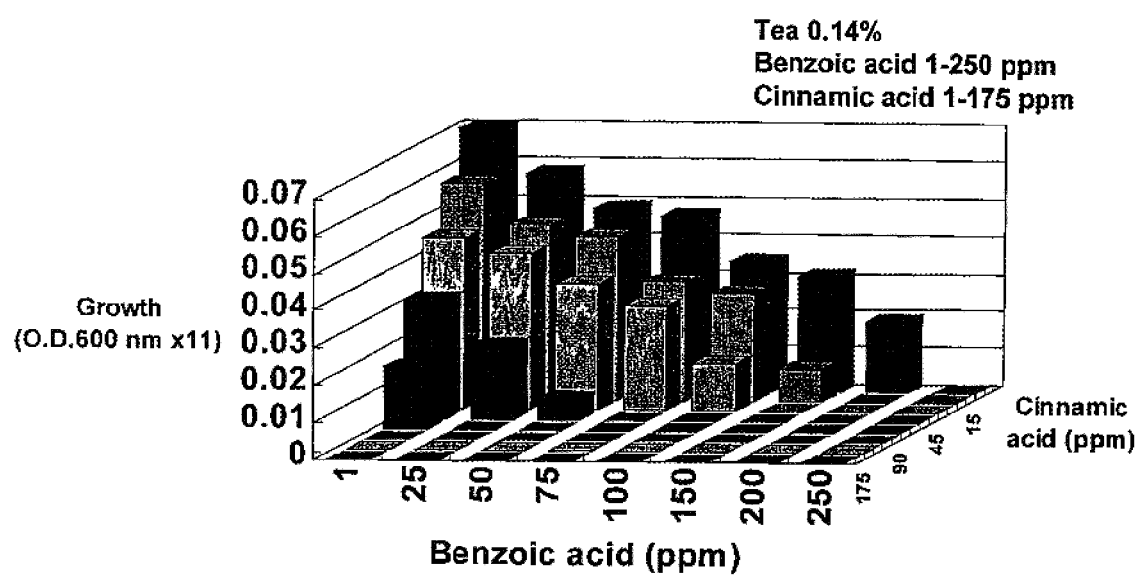
FIG. 13 shows the results of a control experiment of growth of yeast *Saccharomyces cerevisiae* X2180-1B in a matrix of tubes of Ready to Drink tea, 0.14% tea, containing various levels of preservatives, benzoic acid and cinnamic acid.

FIG. 13 shows the results of a control experiment of growth of yeast *Saccharomyces cerevisiae* X2180-1B in a matrix of tubes of Ready to Drink tea, 0.14% tea, containing various levels of preservatives, benzoic acid and cinnamic acid. The matrix of 30 ml tubes each contained 10 ml RTD tea, pH 3.4. Benzoic acid was used in the range 1–250 ppm and cinnamic acid in the range 1–175 ppm. Tubes were inoculated with $10^4$ cells of the yeast *Saccharomyces cerevisiae* X2180-1B. Tubes were then incubated for 14 days at 25° C. to allow surviving yeasts to grow out. At 14 days growth was measured by optical density at 600 nm in x11 diluted samples, and blank values subtracted.

Figure 14:
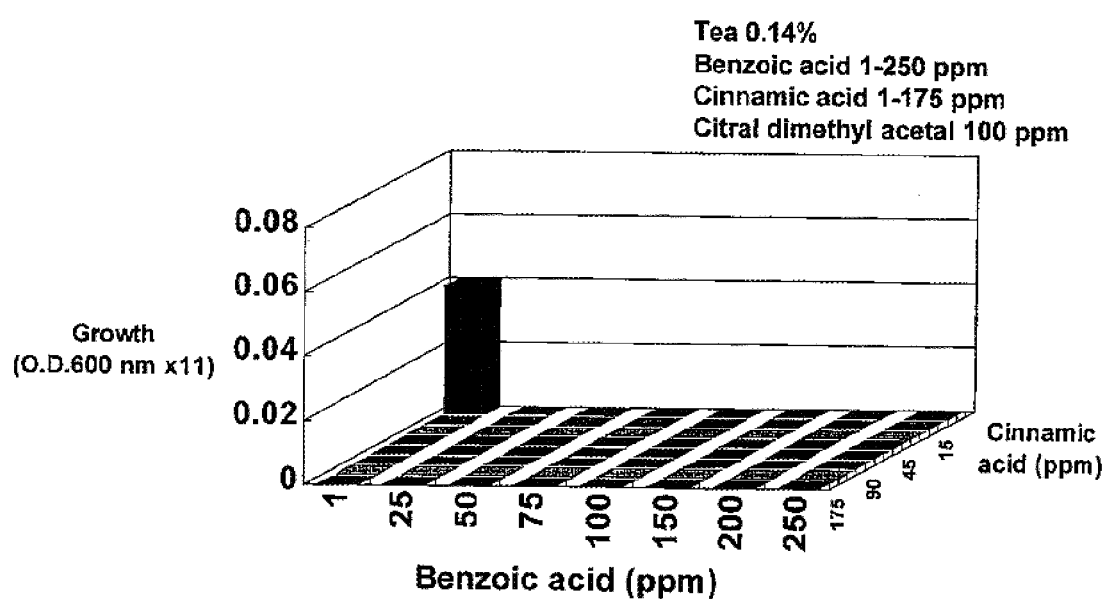
FIG. 14 shows the combined effect of citral dimethyl acetal, cinnamic acid and benzoic acid on growth of yeast *Saccharomyces cerevisiae* X2180-1B in a matrix of tubes of Ready to Drink tea, 0.14% tea.

FIG. 14 shows the combined effect of citral dimethyl acetal, cinnamic acid and benzoic acid on growth of yeast *Saccharomyces cerevisiae* X2180-1B in a matrix of tubes of Ready to Drink tea, 0.14% tea. The matrix of 30 ml tubes each containing 10 ml RTD tea pH 3.4, all contained 100 ppm citral dimethyl acetal. Benzoic acid was used in the range 1–250 ppm and cinnamic acid in the range 1-175 ppm. Tubes were inoculated with $10^4$ cells of the yeast *Saccharomyces cerevisiae* X2180-1B. Tubes were incubated for 14 days at 25° C. to allow surviving yeasts to grow out. At 14 days growth was measured by optical density at 600 nm in x11 diluted samples, and blank values subtracted.

Comparison of this Figure with FIG. 13 shows very substantially fewer tubes supporting yeast growth in the presence of the essential oil component, citral dimethyl acetal, showing a powerful combination effect of essential oil components and preservatives.

Figure 15:
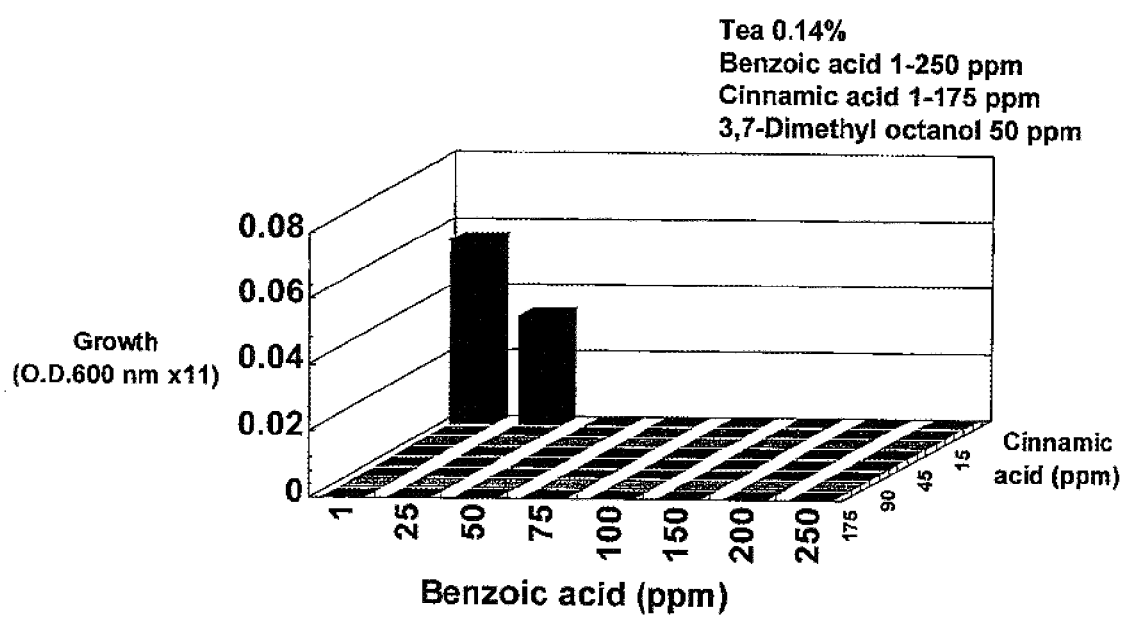
FIG. 15 shows the combined effect of 3,7-dimethyl octanol, cinnamic acid and benzoic acid on growth of yeast *Saccharomyces cerevisiae* X2180-1B in a matrix of tubes of Ready to Drink tea, 0.14% tea.

FIG. 15 shows the combined effect of 3,7-dimethyl octanol, cinnamic acid and benzoic acid on growth of yeast *Saccharomyces cerevisiae* X2180-1B in a matrix of tubes of Ready to Drink tea, 0.14% tea. The matrix of 30 ml tubes each containing 10 ml RTD tea pH 3.4, all contained 50 ppm 3,7-dimethyl octanol. Benzoic acid was used in the range 1–250 ppm and cinnamic acid in the range 1-175 ppm. Tubes were inoculated with $10^4$ cells of the yeast *Saccharomyces cerevisiae* X2180-1B. Tubes were incubated for 14 days at 25° C. to allow surviving yeasts to grow out. At 14 days growth was measured by optical density at 600 nm in x11 diluted samples, and blank values subtracted.

Comparison of this Figure with FIG. 13 shows very substantially fewer tubes supporting yeast growth in the presence of the essential oil component, 3,7-dimethyl octanol, showing a powerful combination effect of essential oil components and preservatives.

Figure 16:
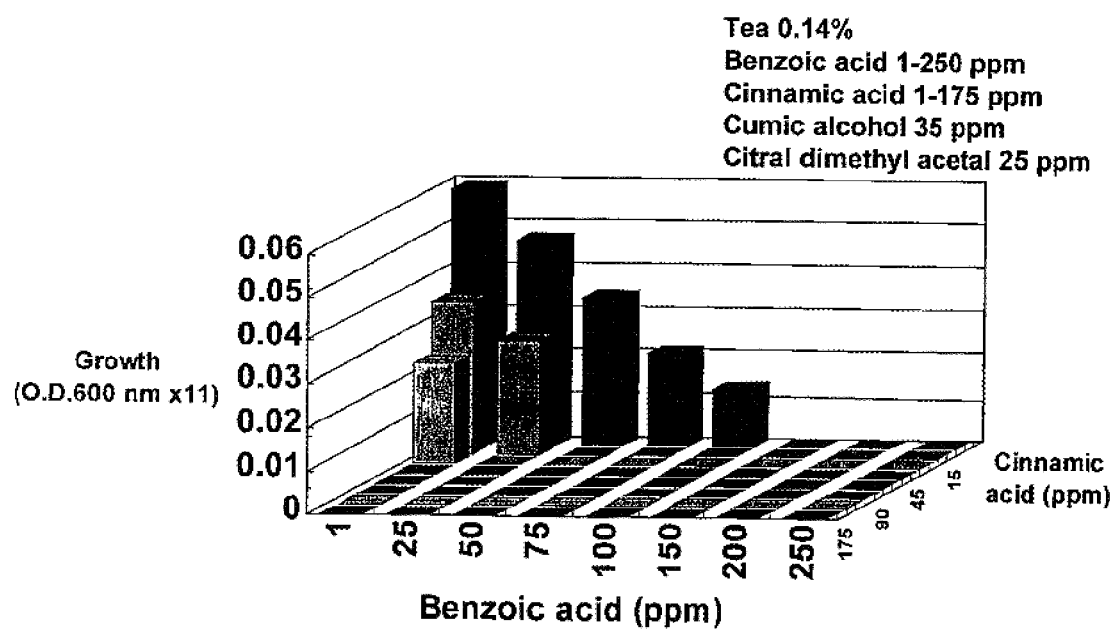
FIG. 16 shows the combined effect of citral dimethyl acetal, cumic alcohol, cinnamic acid and benzoic acid on growth of yeast *Saccharomyces cerevisiae* X2180-1B in a matrix of tubes of Ready to Drink tea, 0.14% tea.

FIG. 16 shows the combined effect of citral dimethyl acetal, cumic alcohol, cinnamic acid and benzoic acid on growth of yeast *Saccharomyces cerevisiae* X2180-1B in a matrix of tubes of Ready to Drink tea, 0.14% tea. The matrix of 30 ml tubes each containing 10 ml RTD tea pH 3.4, all contained 25 ppm citral dimethyl acetal and 35 ppm cumic alcohol. Benzoic acid was used in the range 1–250 ppm and cinnamic acid in the range 1–175 ppm. Tubes were inoculated with $10^4$ cells of the yeast *Saccharomyces cerevisiae* X2180-1B. Tubes were incubated for 14 days at 25° C. to allow surviving yeasts to grow out. At 14 days growth was measured by optical density at 600 nm in x11 diluted samples, and blank values subtracted.

Comparison of this Figure with FIG. 13 shows very substantially fewer tubes supporting yeast growth in the presence of the essential oil components, citral dimethyl acetal and cumic alcohol, showing a powerful combination effect of essential oil components and preservatives.

EXAMPLE 4

Benzoic Acid in Synthetic Soft Drink Experiments

Figure 17:
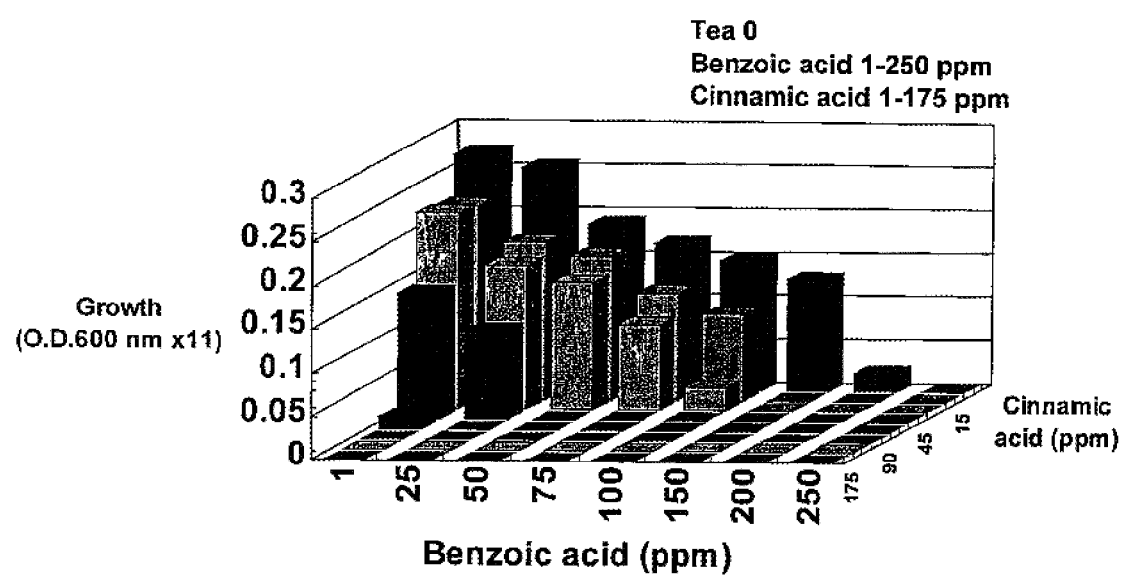
FIG. 17 shows the results of a control experiment of growth of yeast *Saccharomyces cerevisiae* X2180-1B in a matrix of tubes of synthetic soft drink, 0% tea, containing various levels of preservatives, benzoic acid and cinnamic acid.

FIG. 17 shows the results of a control experiment of growth of yeast *Saccharomyces cerevisiae* X2180-1B in a matrix of tubes of synthetic soft drink, 0% tea, containing various levels of preservatives, benzoic acid and cinnamic acid. Synthetic soft drink contained glucose, 8%w/v, citric acid 3 g/l, potassium orthophosphate 1 g/l, magnesium chloride 0.1 g/l and yeast extract 0.1 g/l. The matrix of 30 ml tubes each contained 10 ml synthetic soft drink, pH 3.4. Benzoic acid was used in the range 1–250 ppm and cinnamic acid in the range 1–175 ppm. Tubes were inoculated with $10^4$ cells of the yeast *Saccharomyces cerevisiae* X2180-1B. Tubes were then incubated for 14 days at 25° C. to allow surviving yeasts to grow out. At 14 days growth was measured by optical density at 600 nm in x11 diluted samples, and blank values subtracted.

Figure 18:
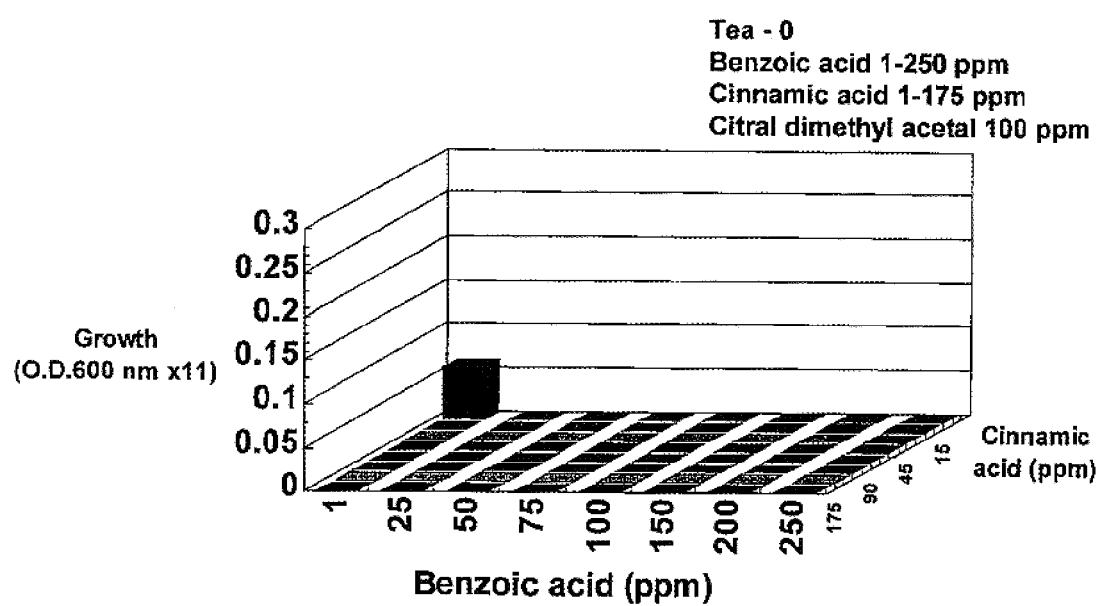

FIG. 18 shows the combined effect of citral dimethyl acetal, cinnamic acid and benzoic acid on growth of yeast *Saccharomyces cerevisiae* X2180-1B in a matrix of tubes of synthetic soft drink, 0% tea. Synthetic soft drink contained glucose, 8%w/v, citric acid 3 g/l, potassium orthophosphate 1 g/l, magnesium chloride 0.1 g/l and yeast extract 0.1 g/l. The matrix of 30 ml tubes each containing 10 ml synthetic soft drink pH 3.4, all contained 100 ppm citral dimethyl acetal. Benzoic acid was used in the range 1–250 ppm and cinnamic acid in the range 1–175 ppm. Tubes were inoculated with 1 cells of the yeast *Saccharomyces cerevisiae* X2180-1B. Tubes were incubated for 14 days at 25° C. to allow surviving yeasts to grow out. At 14 days growth was measured by optical density at 600 nm in x11 diluted samples, and blank values subtracted.

Comparison of this Figure with FIG. 17 shows very substantially fewer tubes supporting yeast growth in the presence of the essential oil component, citral dimethyl acetal, showing a powerful combination effect of essential oil components and preservatives.

EXAMPLE 5

Sorbic Acid+Benzoic Acid in RTD Tea Experiments

Figure 19:
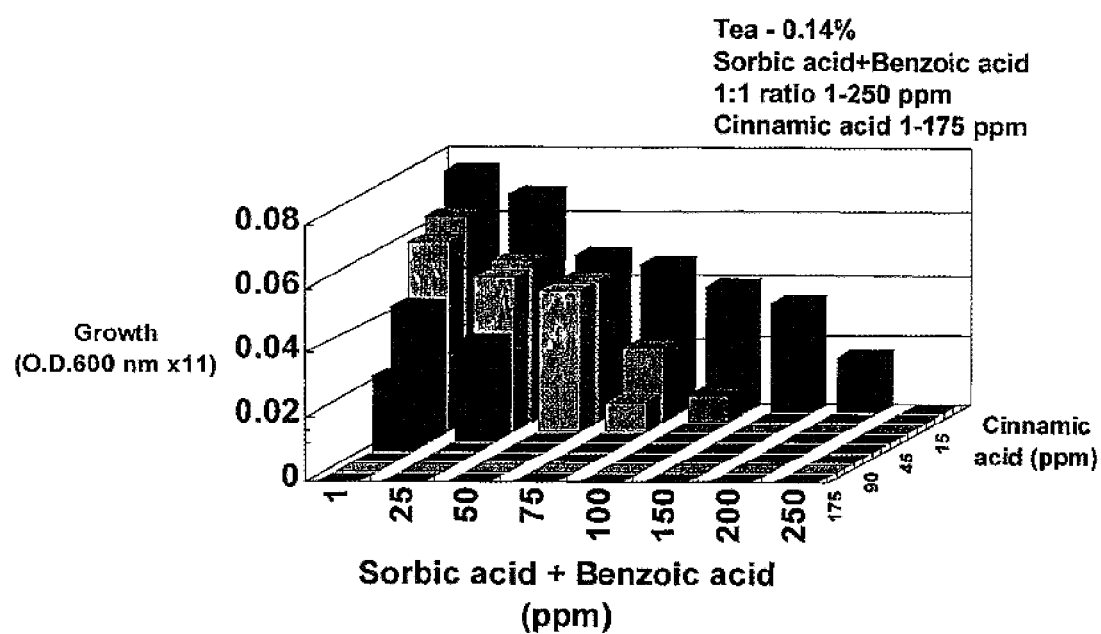
FIG. 19 shows the results of a control experiment of growth of yeast *Saccharomyces cerevisiae* X2180-1B in a matrix of tubes of Ready to Drink tea, 0.14% tea, containing various levels of preservatives, sorbic acid, benzoic acid and cinnamic acid.

FIG. 19 shows the results of a control experiment of growth of yeast *Saccharomyces cerevisiae* X2180-1B in a matrix of tubes of Ready to Drink tea, 0.14% tea, containing various levels of preservatives, sorbic acid, benzoic acid and cinnamic acid. The matrix of 30 ml tubes each contained 10 ml RTD tea, pH 3.4. Sorbic acid+Benzoic acid 1:1 ratio, were used in the range 1–250 ppm (e.g. 250 ppm=125 ppm sorbic acid+125 ppm benzoic acid) and cinnamic acid in the range 1–175 ppm. Tubes were inoculated with $10^4$ cells of the yeast *Saccharomyces cerevisiae* X2180-1B. Tubes were then incubated for 14 days at 25° C. to allow surviving yeasts to grow out. At 14 days growth was measured by optical density at 600 nm in x11 diluted samples, and blank values subtracted.

Figure 20:
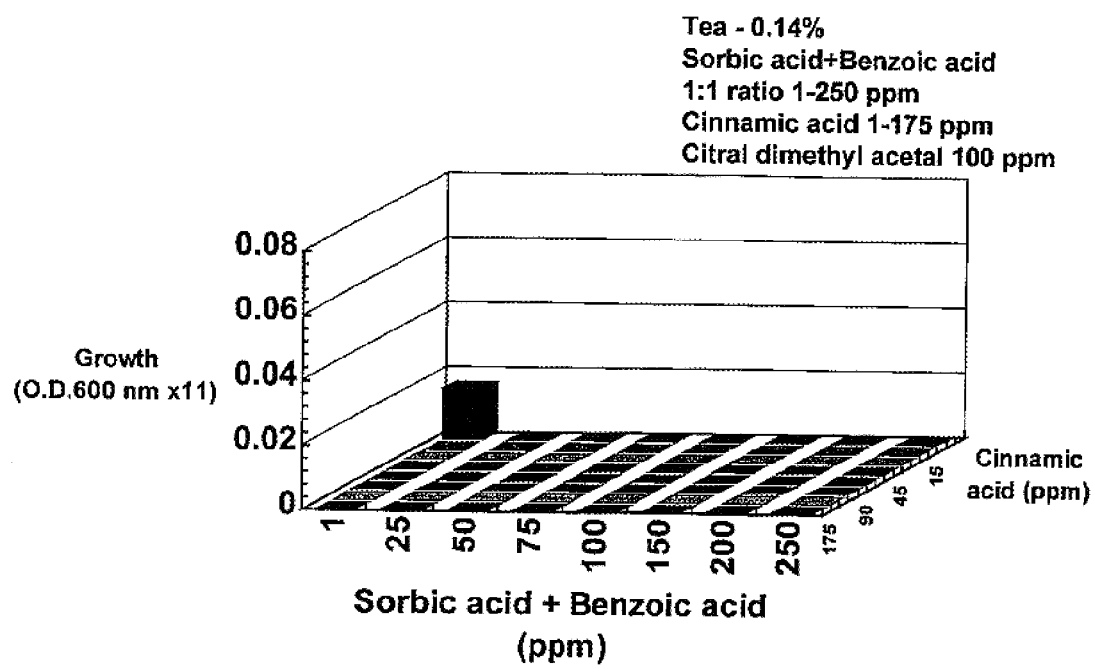
FIG. 20 shows the combined effect of citral dimethyl acetal, cinnamic acid, sorbic acid and benzoic acid on growth of yeast *Saccharomyces cerevisiae* X2180-1B in a matrix of tubes of Ready to Drink tea, 0.14% tea.

FIG. 20 shows the combined effect of citral dimethyl acetal, cinnamic acid, sorbic acid and benzoic acid on growth of yeast *Saccharomyces cerevisiae* X2180-1B in a matrix of tubes of Ready to Drink tea, 0.14% tea. The matrix of 30 ml tubes each containing 10 ml RTD tea pH 3.4, all contained 100 ppm citral dimethyl acetal. Sorbic acid+Benzoic acid 1:1 ratio, were used in the range 1–250 ppm (e.g. 250 ppm=125 ppm sorbic acid+125 ppm benzoic acid) and cinnamic acid in the range 1–175 ppm. Tubes were inoculated with $10^4$ cells of the yeast *Saccharomyces cerevisiae* X2180-1B. Tubes were incubated for 14 days at 25° C. to allow surviving yeasts to grow out. At 14 days growth was measured by optical density at 600 nm in x11 diluted samples, and blank values subtracted.

Comparison of this Figure with FIG. 19 shows very substantially fewer tubes supporting yeast growth in the presence of the essential oil component, citral dimethyl acetal, showing a powerful combination effect of essential oil components and preservatives.

Figure 21:
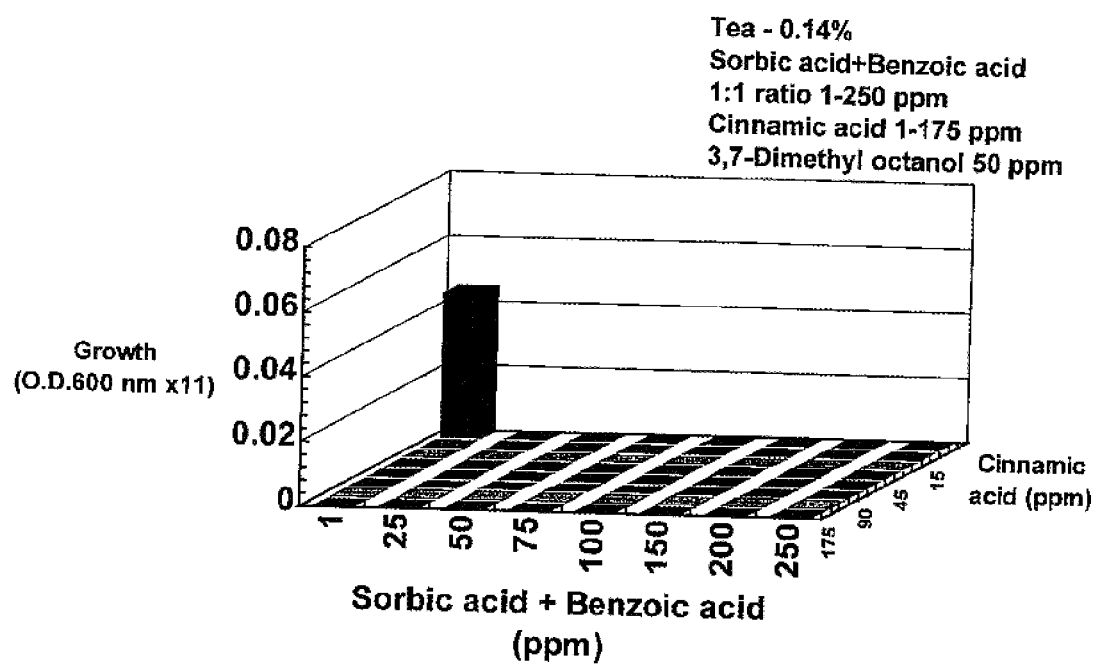
FIG. 21 shows the combined effect of 3,7-dimethyl octanol, cinnamic acid, sorbic acid and benzoic acid on growth of yeast *Saccharomyces cerevisiae* X2180-1B in a matrix of tubes of Ready to Drink tea, 0.14% tea.

FIG. 21 shows the combined effect of 3,7-dimethyl octanol, cinnamic acid, sorbic acid and benzoic acid on growth of yeast *Saccharomyces cerevisiae* X2180-1B in a matrix of tubes of Ready to Drink tea, 0.14% tea. The matrix of 30 ml tubes each containing 10 ml RTD tea pH 3.4, all contained 50 ppm 3,7-dimethyl octanol. Sorbic acid+Benzoic acid 1:1 ratio, were used in the range 1–250 ppm (e.g. 250 ppm=125 ppm sorbic acid+125 ppm benzoic acid) and cinnamic acid in the range 1–175 ppm. Tubes were inoculated with $10^4$ cells of the yeast *Saccharomyces cerevisiae* X2180-1B. Tubes were incubated for 14 days at 25° C. to allow surviving yeasts to grow out. At 14 days growth was measured by optical density at 600 nm in x11 diluted samples, and blank values subtracted.

Comparison of this Figure with FIG. 19 shows very substantially fewer tubes supporting yeast growth in the presence of the essential oil component, 3,7-dimethyl octanol, showing a powerful combination effect of essential oil components and preservatives.

Figure 22:
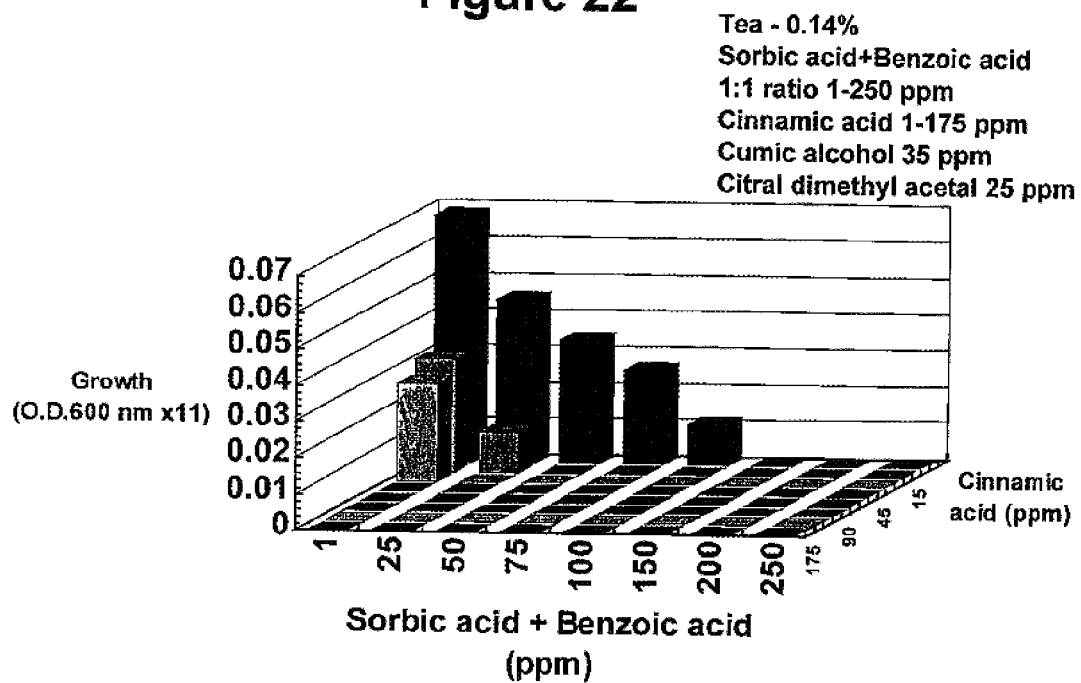
FIG. 22 shows the combined effect of citral dimethyl acetal, cumic alcohol, cinnamic acid, sorbic acid and benzoic acid on growth of yeast *Saccharomyces cerevisiae* X2180-1B in a matrix of tubes of Ready to Drink tea, 0.14% tea.

FIG. 22 shows the combined effect of citral dimethyl acetal, cumic alcohol, cinnamic acid, sorbic acid and benzoic acid on growth of yeast *Saccharomyces cerevisiae* X2180-1B in a matrix of tubes of Ready to Drink tea, 0.14% tea. The matrix of 30 ml tubes each containing 10 ml RTD tea pH 3.4, all contained 25 ppm citral dimethyl acetal and 35 ppm cumic alcohol. Sorbic acid+Benzoic acid 1:1 ratio, were used in the range 1–250 ppm (e.g. 250 ppm=125 ppm sorbic acid+125 ppm benzoic acid) and cinnamic acid in the range 1–175 ppm. Tubes were inoculated with $10^4$ cells of the yeast *Saccharomyces cerevisiae* X2180-1B. Tubes were incubated for 14 days at 25° C. to allow surviving yeasts to grow out. At 14 days growth was measured by optical density at 600 nm in x11 diluted samples, and blank values subtracted.

Comparison of this Figure with FIG. 19 shows very substantially fewer tubes supporting yeast growth in the presence of the essential oil components, citral dimethyl acetal and cumic alcohol, showing a powerful combination effect of essential oil components and preservatives.

EXAMPLE 6

Sorbic Acid+Benzoic Acid in Synthetic Soft Drink Experiments

Figure 23:
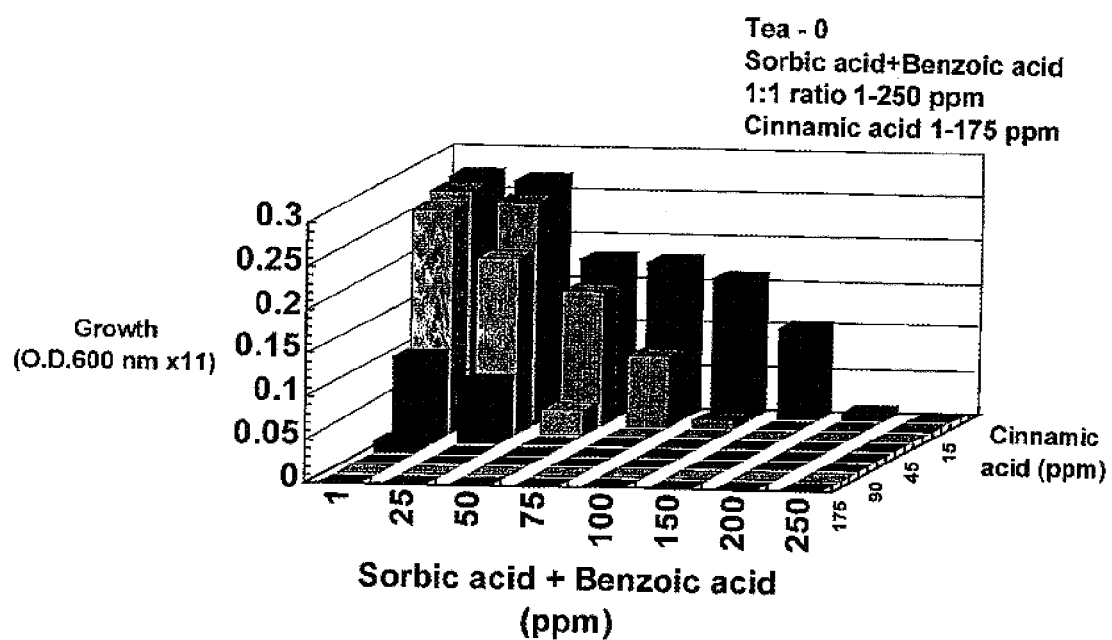
FIG. 23 shows the results of a control experiment of growth of yeast *Saccharomyces cerevisiae* X2180-1B in a matrix of tubes of synthetic soft drink, 0% tea, containing various levels of preservatives, sorbic acid, benzoic acid and cinnamic acid.

FIG. 23 shows the results of a control experiment of growth of yeast *Saccharomyces cerevisiae* X2180-1B in a matrix of tubes of synthetic soft drink, 0% tea, containing various levels of preservatives, sorbic acid, benzoic acid and cinnamic acid. Synthetic soft drink contained glucose, 8%w/v, citric acid 3 g/l, potassium orthophosphate 1 g/l, magnesium chloride 0.1 g/l and yeast extract 0.1 g/l. The matrix of 30 ml tubes each contained 10 ml synthetic soft drink, pH 3.4. Sorbic acid+Benzoic acid 1:1 ratio, were used in the range 1–250 ppm (e.g. 250 ppm=125 ppm sorbic acid+125 ppm benzoic acid) and cinnamic acid in the range 1–175 ppm. Tubes were inoculated with $10^4$ cells of the yeast *Saccharomyces cerevisiae* X2180-1B. Tubes were then incubated for 14 days at 25° C. to allow surviving yeasts to grow out. At 14 days growth was measured by optical density at 600 nm in x11 diluted samples, and blank values subtracted.

Figure 24:
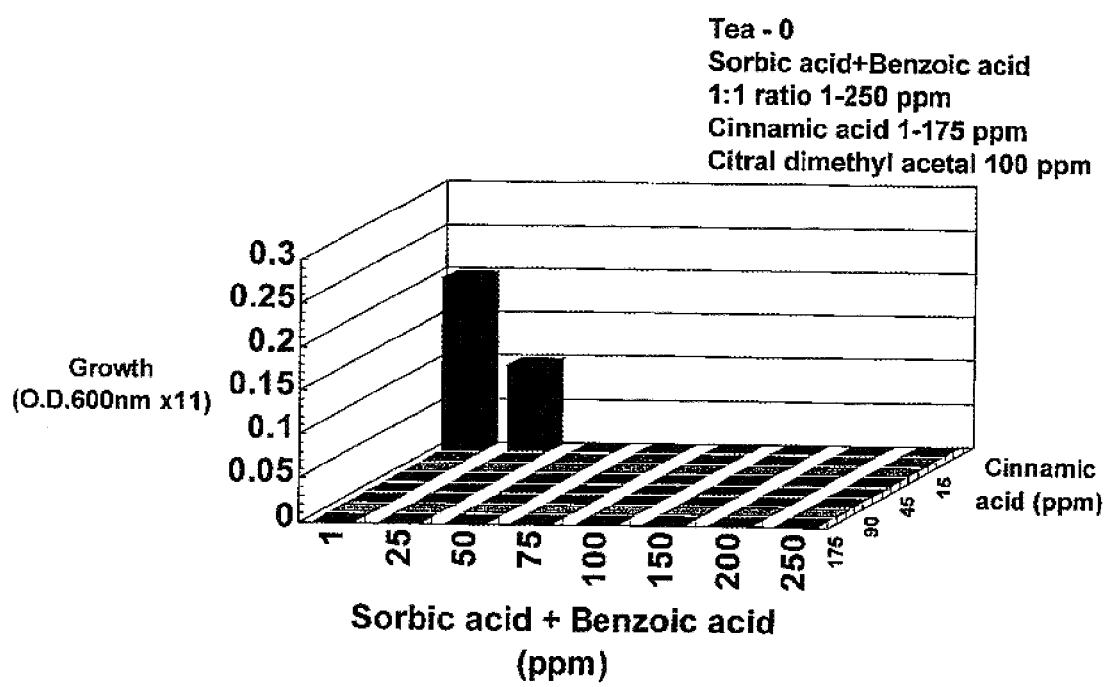
FIG. 24 shows the combined effect of citral dimethyl acetal, cinnamic acid, sorbic acid and benzoic acid on growth of yeast *Saccharomyces cerevisiae* X2180-1B in a matrix of tubes of synthetic soft drink, 0% tea.

FIG. 24 shows the combined effect of citral dimethyl acetal, cinnamic acid, sorbic acid and benzoic acid on growth of yeast *Saccharomyces cerevisiae* X2180-1B in a matrix of tubes of synthetic soft drink, 0% tea. Synthetic soft drink contained glucose, 8%w/v, citric acid 3 g/l, potassium orthophosphate 1 g/l, magnesium chloride 0.1 g/l and yeast extract 0.1 g/l. The matrix of 30 ml tubes each containing 10 ml synthetic soft drink pH 3.4, all contained 100 ppm citral dimethyl acetal. Sorbic acid+Benzoic acid 1:1 ratio, were used in the range 1–250 ppm (e.g. 250 ppm=125 ppm sorbic acid+125 ppm benzoic acid) and cinnamic acid in the range 1–175 ppm. Tubes were inoculated with $10^4$ cells of the yeast *Saccharomyces cerevisiae* X2180-1B. Tubes were incubated for 14 days at 25° C. to allow surviving yeasts to grow out. At 14 days growth was measured by optical density at 600 nm in x11 diluted samples, and blank values subtracted.

Comparison of this Figure with FIG. 23 shows very substantially fewer tubes supporting yeast growth in the presence of the essential oil component, citral dimethyl acetal, showing a powerful combination effect of essential oil components and preservatives.

Figure 25:
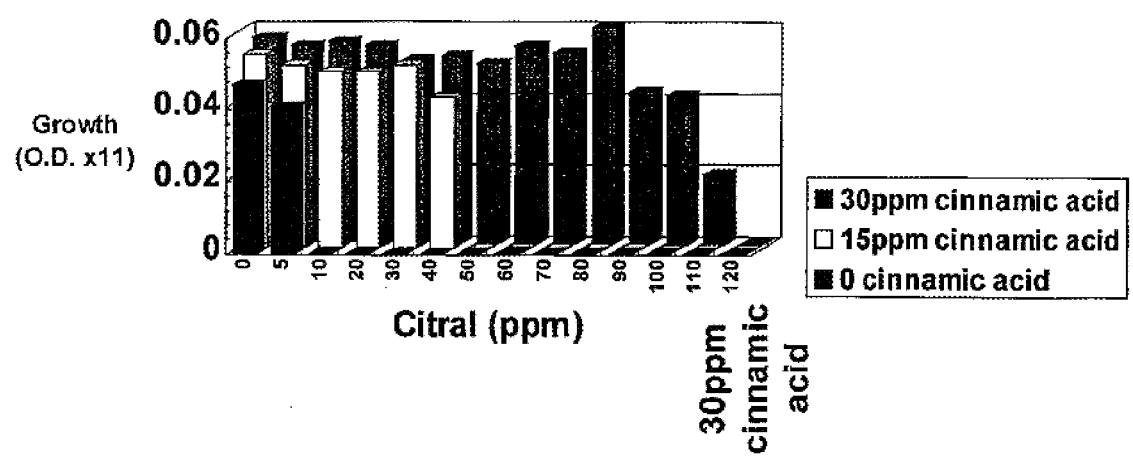
FIG. 25 shows the effective concentrations of the essential oil component, citral. Growth of yeast *Saccharomyces cerevisiae* X2180-1B in 30 ml bottles containing RTD tea, 0.14% tea containing 0, 15 ppm or 30 ppm of cinnamic acid.

FIG. 25 shows the effective concentrations of the essential oil component, citral. Growth of yeast *Saccharomyces cerevisiae* X2180-1B in 30 ml bottles containing RTD tea, 0.14% tea containing 0, 15 ppm or 30 ppm of cinnamic acid. Rows of tubes also contained citral at concentrations ranging between 0–120 ppm. After inoculation at $10^4$ cells of yeast, tubes were then incubated for 14 days at 25° C. to allow surviving yeasts to grow out. At 14 days growth was measured by optical density at 600 nm in x11 diluted samples, and blank values subtracted.

Figure 26:
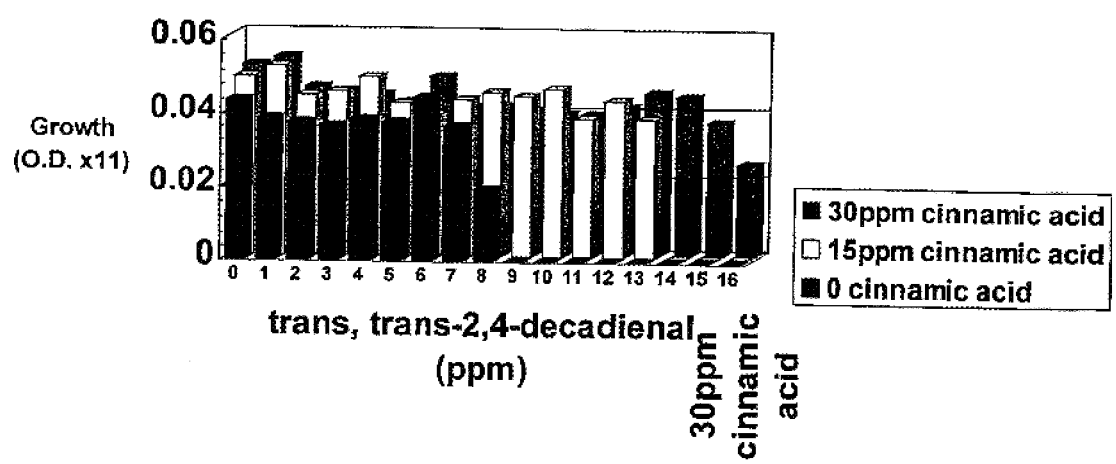
FIG. 26 shows the effective concentrations of the essential oil component, trans, trans-2,4-decadienal.

FIG. 26 shows the effective concentrations of the essential oil component, trans, trans-2,4-decadienal. Growth of yeast *Saccharomyces cerevisiae* X2180-1B in 30 ml bottles containing RTD tea, 0.14% tea containing 0, 15 ppm or 30 ppm of cinnamic acid. Rows of tubes also contained trans, trans-2,4-decadienal at concentrations ranging between 0–16 ppm. After inoculation at $10^4$ cells of yeast, tubes were then incubated for 14 days at 25° C. to allow surviving yeasts to grow out. At 14 days growth was measured by optical density at 600 nm in x11 diluted samples, and blank values subtracted.

Figure 27:
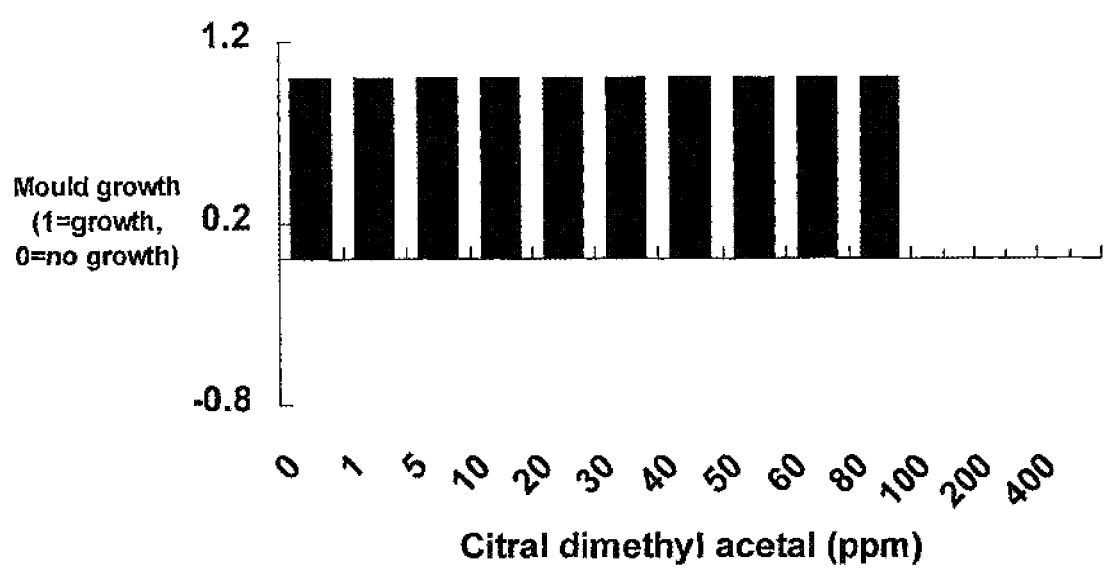
FIG. 27 demonstrates the requirement for essential oil components in addition to preservatives to prevent spoilage of RTD tea.

FIG. 27 demonstrates the requirement for essential oil components in addition to preservatives to prevent spoilage of RTD tea. Growth of spoilage mould *Aspergillus niger* POL10 in 30 ml tubes each contained 10 ml RTD tea, pH 3.1, 0.14% tea. All tubes containing sorbic acid 200 ppm, cinnamic acid 60 ppm, EDTA 30 ppm. An essential oil component, citral dimethyl acetal, was added in increasing concentration to tubes, in the range 1–400 ppm. Tubes were inoculated with $10^4$ conidiaspores of the mould *Aspergillus niger* POL10. Tubes were then incubated for 28 days at 25° C. to allow moulds to grow out. At 28 days growth was measured visually. Mould growth was visible in all tubes, excepting those containing >80 ppm citral dimethyl acetal.

What is claimed is:

1. A beverage that contains a preservative system comprising 1 to 175 ppm cinnamic acid, 10 to 200 ppm sorbic acid or benzoic acid, and 1 to 100 ppm of at least one essential oil other than cinnamic acid.

2. A beverage according to claim 1 wherein the essential oil is selected from the group consisting of benzyl-4-hydroxybenzoate, 4-tert-butylcyclohexanone, carvone, cinnamaldehyde, citral, citral dimethyl acetal, citronellol, cumic alcohol, cyclohexanebutyric acid, 2-cyclohexylethyl acetate, trans,trans-2,4-decadienal, decanal, decanol, dihydrocarveol, 3,7-dimethyl-1-octanol, ethyl cyclohexanepropionate, ethyl pyruvate, ethyl vanillin, jasmone, o-methoxycinnamaldehyde, methyl anthranilate, α-methyl-trans-cinnamaldehyde, methyl eugenol, methyl nonanoate, 2-methyl-2-pentenal, 5-methyl-2-phenyl-2-hexenal, methyl salicylate, 4-methyl-5-thiazoleethanol acetate, myrtenol, neomenthol, nonanoic acid, γ-nonanoic lactone, δ-octalactone, octanoic acid (caprylic), 1-octanol, 1-phenyl-1,2-propanedione, piperonyl acetate, propyl benzoate, pulegone, sorbic aldehyde (2,4-hexadienal), terpinen-4-ol, tolualdehyde, γ-undecalactone, undecanal, 1-undecanol, and vanillin.

3. A beverage according to claim 2 wherein the essential oil is selected from the group consisting of citral, citral dimethyl acetal, cumic alcohol (isopropylbenzyl alcohol), trans,trans-2,4-decadienal, 3,7-dimethyl-1-octanol, ethyl pyruvate, myrtenol and piperonyl acetate.

4. A beverage according to claim 1 wherein the preservative system contains 50 to 150 ppm sorbic acid.

5. A beverage according to claim 1 wherein the preservative system contains 50 to 150 ppm benzoic acid.

6. A beverage according to claim 1 wherein the beverage is a tea based beverage.

7. A beverage according to claim 6 wherein the beverage contains 0.01 to 3% tea solids.

8. A beverage that contains a preservative system comprising 1 to 30 ppm cinnamic acid, 50 to 150 ppm sorbic add, 1 to 30 ppm citral dimethyl acetal, 1 to 40 ppm cumic alcohol, 1 to 20 ppm myrtenol, 1–20 ppm piperonyl acetate and at least one essential oil other than cinnamic acid.

* * * * *